(12) United States Patent
Thomas

(10) Patent No.: US 6,767,212 B2
(45) Date of Patent: Jul. 27, 2004

(54) NETWORK-ASSISTED BEHAVIOR MANAGEMENT SYSTEM

(76) Inventor: Glenn Roy Thomas, 21150 Saratoga Hills Rd., Saratoga, CA (US) 95070

(*) Notice: Subject to any disclaimer, the term of this patent is extended or adjusted under 35 U.S.C. 154(b) by 42 days.

(21) Appl. No.: 09/900,913

(22) Filed: Jul. 9, 2001

(65) Prior Publication Data

US 2003/0008268 A1 Jan. 9, 2003

(51) Int. Cl.$^7$ ............................................. G09B 19/00

(52) U.S. Cl. ..................... 434/236; 434/238; 434/219

(58) Field of Search ................................ 434/236, 238, 434/219

(56) References Cited

U.S. PATENT DOCUMENTS

| | | | | |
|---|---|---|---|---|
| 5,907,831 A | * | 5/1999 | Lotvin et al. ................. | 705/14 |
| 5,954,510 A | * | 9/1999 | Merrill et al. .............. | 434/236 |
| 5,967,789 A | * | 10/1999 | Segel et al. ................. | 434/236 |

* cited by examiner

Primary Examiner—Jessica Harrison
Assistant Examiner—John Sotomayor
(74) Attorney, Agent, or Firm—Kenneth W. Thomas

(57) ABSTRACT

System and method allowing parents, teachers, and helping professionals to automatically incorporate rewards selected from an electronic catalog into a network-assisted behavior management system to motivate children to perform selected behaviors and third party performance programs. Selected rewards are automatically purchased by and shipped to the parent or teacher. System is delivered to multiple remote devices, including personal computers, personal data assistants, network computers, terminals, screen phones, web pads, smart phones, interactive television, interactive game consoles, two-way pagers, or e-mail-only devices.

The system is comprised of a set of modular components that are organized into session sets for a parent/teacher and for a particular child or groups of children. These include a child component where behaviors in text and pictorial form are selected and created, or an external third-party program such as a math drill program that has the ability to send to the system performance parameters that constitute a level of performance as a specified behavior.

Other components include Adult Administrator Set-Up, Child's Name and Password set-up, Standard Lists of Behaviors, Contracts and Messages, Chart with Behaviors, Points and Contract, Reward Selection with automatic purchasing and shipment, Surprise Screens with Point Trigger, Point Goal Progress Animation, Encouragement Screens, Point Earned Certificate Printout Option, and Print out Wall Chart Option. A parent or teacher may create a chart using three different choices of elements: Private or Public, Individual or Group (where Groups are Private or Public), and Cooperative or Comparative. A chart can have eight unique combinations of these elements.

9 Claims, 16 Drawing Sheets

NETWORK-ASSISTED BEHAVIOR MANAGEMENT SYSTEM

FIELD OF INVENTION

The invention relates to the general fields of parenting, education and interactive behavioral motivational systems.

BACKGROUND OF THE INVENTION

Positive reinforcement is basic to all learning behavior in living organisms. If a behavior is followed by a pleasant experience, the likelihood of the event reoccurring is increased. This seems like common sense to us today; however, the concept of positive reinforcement was not clearly investigated until the end of the nineteenth century. E. L. Thorndike postulated the concept of satisfying consequences (rewards) in the late 1890s. The reward system is a proven, effective tool for increasing rates of positive behavior.

A common form of a reward system is called the star chart. The star chart is made up of seven columns that represent the seven days of the week plus a row for each behavior. Star stickers are placed in a square that represents a behavior and the day it was performed. A reward is given after the child earns a predetermined number of stars.

Present inventor THOMAS has made known a computer software program stored on two distinct five-and-a-half-inch computer disk drive floppies. The first was labeled the "Parent/Teacher Disk." This "Parent/Teacher Disk" contained the authoring program that a parent or teacher would place into a computer disk drive, power on the computer, and loads the main program into the computer memory.

After the program was installed, the parent or teacher would take out the "Parent/Teacher Disk" out of the disk drive and replace it with a second five and a half inch floppy called the "Child's Disk." This "Child's Disk" became the place where the parent or teacher saved the Child's name, password, behaviors assigned, contract with a reward in text form only, only three possible graphic screens with motivating text, and only one points earned goal screen for the child's usage.

The child used the computer assisted behavior management program by inserting the "Child's Disk," with his name and password stored on it into the computer disk drive. The child then turned on the computer power switch to load the child's program. The program displayed on a computer monitor, in text, the behaviors that the parent or teacher picked for the child to perform. The child selected "yes" or "no" after each behavior and after finishing could have viewed one of only three graphic screens supplied with a motivating text message if it was set up by the parent or teacher. The child viewed only a single graphic representation of how far he was from finishing his point goal. Lastly certificates with the total points earned were printed out using only text. The points that the child earned were stored on the "Child's Disk" that the parent or teacher view and format into a printable record for later reference.

This method was an advancement over other children's motivational methods because it allowed parents or teachers a simple method for presenting to a child, on a standalone computer using five-and-one-half-inch floppies, to enter by text any rewards and any positive behaviors that the parent or teacher wanted the child to perform and store the results on a five-and-one-half-inch storage floppy. Performance statistics were easily computed over time and presented in a printable record.

Although I have made the previous known, it is inadequate. Entering text to represent a behavior, and a reward in the contract, made the behavior and reward less concrete and visual. This is especially important for children who have limited reading abilities. The parent or teacher would have to go out and purchase the reward ahead of time or find a time, sometimes inconveniently, to go out after the reward was earned. This system was more likely to produce delays in rewarding the child, thereby reducing the effectiveness of the positive reinforcer.

Also, no third-party program such as a math drill program could use the previous invention by THOMAS.

Finally, the method of storage of program and data on a five-and-one-half-inch floppy made it vulnerable to accidents and children's mischief. Field-testing of the method showed occurrences of purposeful destruction of other children's diskette floppies by children whose behavioral performance was low. Due to electronic storage limitations this method of program distribution allowed only three reinforcing static graphics and only one point goal screen. Parents and teachers could not make full use of the degree of reinforcement that novel multimedia reinforcement screens can produce. The previous method allowed only a finite number of days to record daily points. In some cases the method allowed less than one month to record points. This method did not allow access by third-party educational programs such as math drill computer software programs to pass results to the system to access reinforcing components. Previous system allowed usage with only a 5.5-inch floppy-based system, thereby making the system limited to those using 5.5-inch floppy disk drives. This system mandated that parent, teacher, and child use the software at the same location at the same time for the safety of the data, thereby disallowing distance learning motivational systems. A separated parent thousands of miles away could not set up a motivational system, have his child use it at the other parents home, and view the results. It also did not allow a child to join as an individual or group member to a chart created by another parent or teacher.

SUMMARY OF THE INVENTION

Accordingly, it is an object of this invention a system for a parent, teacher or authorized adult with a child to electronically select a reward from an electronic catalog of rewards that automatically becomes a visual and motivating component of an electronic behavior management system.

It is an object of this invention that after a reward is selected from the electronic catalog the reward is automatically billed and shipped to the parent or teacher.

It is an object of this invention that a "reward chest" or database is augmented each time a parent or teacher chooses a reward in the electronic catalog. The reward remains in the "reward chest" until the child earns it in the electronic behavior management system session by earning the number of points assigned by the parent or teacher.

It is an object of this invention that a visual representation of a behavior be used to present to a child a behavior from which to respond an acknowledgement of performance. This concrete behavioral representation is motivating and helpful for a child who has limited reading abilities.

Another object of this invention is a system and method for delivering network-assisted behavior management to a remote device. The parent or teacher sets up the components of the behavior management system through a remote device. Similarly, a child interacts with the components of the behavior management system on a remote device, but not necessarily the same remote device or even the same location as the parent or adult.

Previous method of program distribution allowed only three reinforcing static graphics to be used by parents and teacher, thereby limiting the degree of reinforcement that novel multimedia reinforcement screens can produce. Present invention allows numerous multimedia reinforcement screens to be used by the parent or teacher for reinforcing the child.

Previous method allowed only a finite number of days to record daily points, in some cases a month or less. Present method allows an almost unlimited number of days to record points.

Previous method allowed only one point goal screen to be used, thereby limiting the degree of reinforcement that novel multimedia point goal screens can produce. Proposed method allows numerous choices that are updated and accessible.

Previous method did not allow access by third-party educational programs to pass performance parameters to the system to access reinforcing components. Proposed system permits third-party educational programs to access the system and pass performance parameters.

Previous system did not allow for a parent or teacher to select a pictorial representation of a behavior, in the form of a picture or multimedia file, for the child to view. Present system allows a child to view pictorial representations of behaviors. This helps a child with limited or no reading abilities to understand what behavior the parent or teacher is reinforcing.

Previous system allowed usage with only a 5.5-inch floppy based system, thereby rendering the system inadequate. Present system allows the delivery of a motivating system to a myriad of remote devices such as interactive television, interactive gaming consoles, screen phones, personal data assistants, and personal computers thereby increasing possible usage.

Previous system mandated that parent, teacher, and child be at the same location and for safety of data use the system at the same time. Present system allows for adults and child to be at separate locations, thereby allowing distance learning motivational systems. A separated parent thousands of miles away can set up a motivational system, have the child use it at a remote location, and view the results at the parent's home. This advancement also allows for charts to be made for other children to join at any location.

Previous system did not allow for third-party educational programs such as math drill programs to utilize its motivational components to increase performance of preferred behaviors. Present system allows third-party programs to pass performance parameters as behaviors to present electronic behavior management program.

BRIEF DESCRIPTION OF THE DRAWINGS

The components of the network-assisted behavior management system will become clearer through the use of illustrations.

DESCRIPTION OF THE EMBODIMENTS

The present disclosure describes a networked computer-based device for presenting a network-assisted behavior management system to children to motivate them to perform selected behaviors and third-party performance programs. The rewards are selected from an electronic catalog on the network or presented to children as text descriptions. Hereafter, the term "Network-Assisted Behavior Management System" is referred to as "NABMS." An adult such as a parent or teacher uses the Parent/Teachers Module of the NABMS to set up what the child views in the Child's Module. A child can be set up individually or be part of a group of both their own Parent/Teacher's or another Parent/Teacher's NABMS. We use the name "child" or "children" to represent anyone who is performing the behavior and being rewarded through the NABMS.

Figure 1:
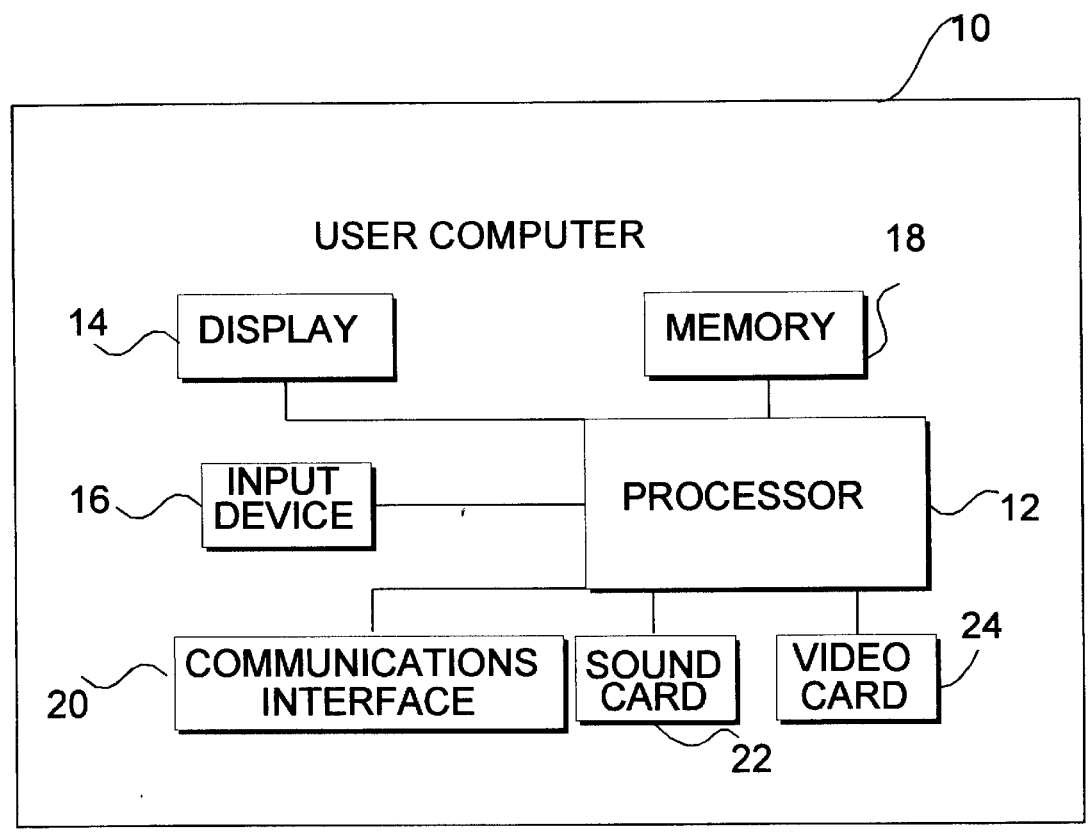
FIG. 1 is a schematic of a single computer for utilization of the Network-Assisted Behavior Management Program.

FIG. 1 illustrates a block diagram representing a typical embodiment of a microprocessor-based unit 10. In one embodiment, the device includes a processor 12, a display 14, an input device 16, a memory 18, and for networked operation the device may include a communications interface 20. The device 10 may be a personal computer with a CPU processor such as a "PENTIUM IV CLASS PROCESSOR" from INTEL running at 1700 MHz clock speeds. The display, or output device 14, may be a SONY 17 inch 0.25 pitch monitor. The output device may be any method for communicating to the end user such as sound, brail, or sighted device. The input device 16 may be a keyboard, mouse, or voice recognition input. The memory 18 may include 256 MB of RDRAM and a 39.8-GB hard drive. A sound card 22 may be a "PLATINUM LIVE CARD" from CREATIVE LABS for generating and processing audio signals and a "MILLENNIUM G400 SERIES" video card 24 from MATROX for processing video signals. The network communications interface 20 may include a 56K baud modem, a cable modem, or a satellite modem connected to the computer through a port and a network interface card, if necessary. A 56K baud modem may be connected to an outside telephone line to the network. The communications interface 20 may operate with other hardware and software components within the unit 10 that allow it to connect to the network e.g., Internet Service Providers (ISPs) such as "MINDSPRING" or "America ON-LINE" that provide portals to the Internet. The processor 12 may execute a dial-up networking program such as MICROSOFTS "DIAL UP NETWORKING PROGRAM" supplied with the WINDOWSME Windows operating system.

Figure 2:
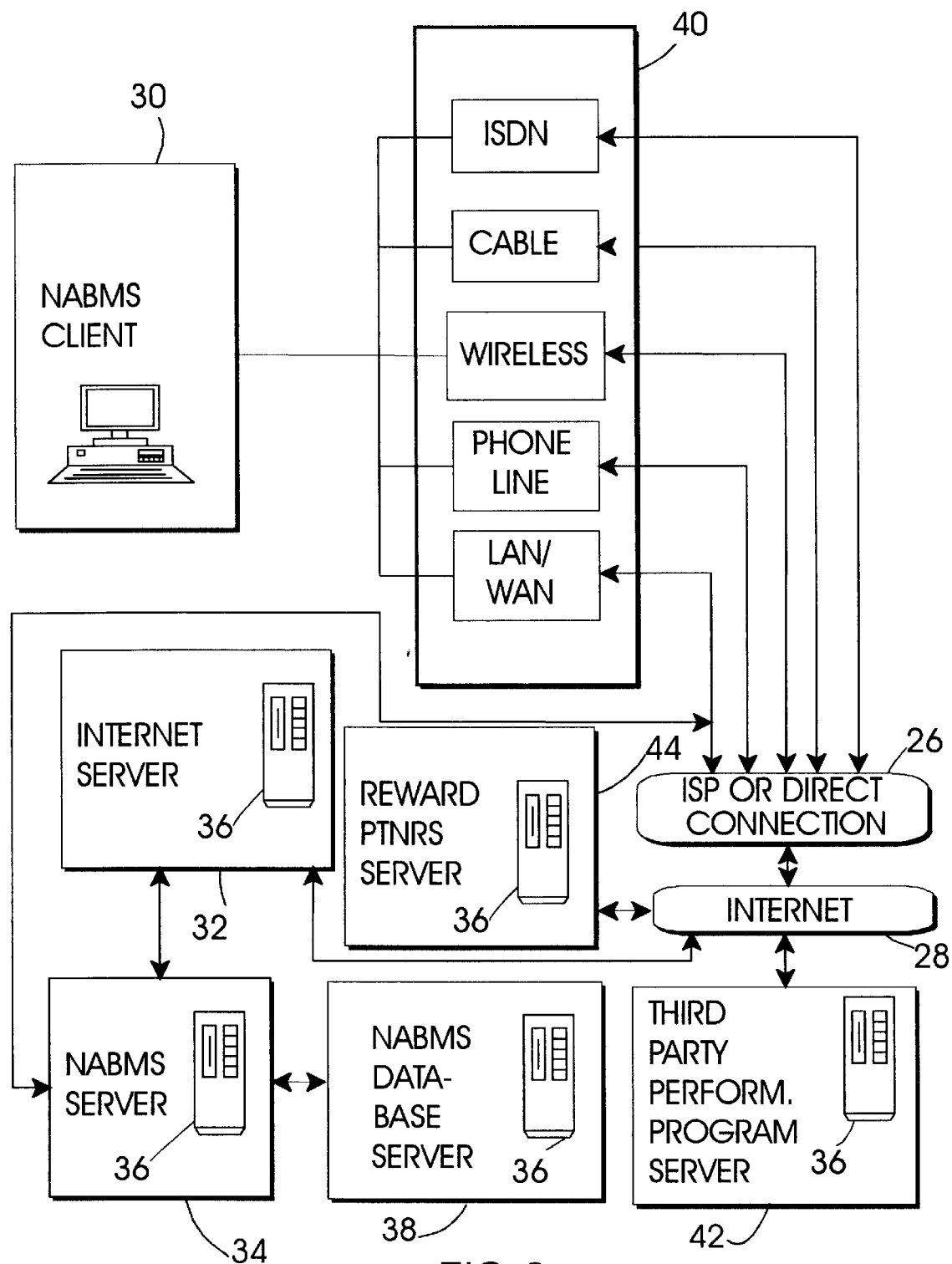
FIG. 2 is a schematic of the network configuration for using the Network-Assisted Behavior Management Program.

FIG. 2 illustrates the connection may be then made with an Internet Service Provider or direct connection 26 to an Internet 28. The user may open a NABMS client 30 (HTTP-aware browser) such as "NETSCAPE" 4.6 browser application from NETSCAPE and view the NABMS client 30 graphic user interface (GUI) using "WINDOWSME" from MICROSOFT.

The user may instruct the NABMS client 30 to contact an Internet server 32 by typing the address or URL of the main page of the NABMS into the address bar of the NABMS client 30. The Internet server 32 may be connected to the Internet by a web-hosting service or by direct connection. The browser sends the user request using HTTP protocol to the Internet server 32. The Internet server 32 requests the NABMS home page from a NABMS server 34 and returns the NABMS home page HTML document using HTTP protocol to be displayed by the client 30. The user is presented with a display layer (GUI) or web page. This web page may include a graphical background and "UI WIDGETS" or "CONTROLS" that are the interface tools that include buttons, scroll bars, check boxes, and clickable images. The web page and its "UI WIDGETS" may have been designed and built using "DREAMWEAVER 4" by MACROMEDIA.

The NABMS may use servers 36 that includes "WINDOWS 2000 SERVER WITH IIS 5.0" from MICROSOFT, "DUAL PENTIUM III 850 MHZ CPUs" from INTEL, 18.2 GB of disk storage, and 256 MB of RAM. The NABMS may use an external database or even a dedicated NABMS database server 38 to store, retrieve, and pass data inputted by the user in the HTML form. Such a database server may include the components of server 36 and MICROSOFT'S "SQL SERVER 2000".

In this case the user defines a query by using the (GUI) interface of the NABMS client 30 and sends it to the Internet server-side processing agent 32 using HTTP protocol. The Internet server may send the query to the NABMS server 34. The NABMS server 34 uses a middleware such as a Common Gateway Interface script written in a Perl language, such as Perl-Win32 from ActiveState, to translate requests from the Internet server 32 to a format that the Database server 38 can understand. The Database server then sends back the results of the query to the NABMS server 34 that uses the "CGI script" to translate Database responses into something the Internet server 32 can send back to the user's NABMS client 30 and display the results of the query in HTML form.

The client 30 HTML containing the CGI request may be sent to run the NABMS server 34 application discussed in the previous paragraph, written in C, C++, Java, or Java servlets—all languages specifically suited to database input/output operations.

A person skilled in the art would understand the process and be able to generate the computer software for the NABMS user parent, teacher, or child. He would also be able to generate the computer software for the networking and database processing 38 for the NABMS, the third-party performance programs, and the site-based or remote electronic catalogs of rewards using existing off-the-self developer software tools such as such as MICROSOFT'S "VISUAL BASIC", "C++", and SUN MICROSYSTEM'S "JAVA". Someone skilled in hardware and network connections would be able to set up necessary hardware, software, and network connections 40.

Hereafter when referring to accessing or sending data to the NABMS Database server 38, whether it is a parent, teacher, or child, we are implying the above possible embodiment of the invention. When the user enters information and uses the input device 16 of FIG. 1 to submit a request or send data to the database 38 we are implying the above description of the user clicking on a "UI WIDGET" or button with a mouse, or using a mechanical device such as a keyboard or other mechanical switch, or voice actuated processing, to send a request to the Internet server 32 using HTTP protocols and CGI, that passes it on to the NABMS server 34. The NABMS server 34 may pass this request to the NABMS Database server 38, which may be a dedicated database server, through the server application program or script on the NABMS server 34, which in turn processes the request from the NABMS database server 38 and returns the data through the server application program or script on the NABMS server to the Internet server 32 to the Web browser client 30 using CGI. This configuration allows the NABMS server 34 to serve up database queries and return them directly to the NABMS client 30 on the local to wide-area-network 40, and internet 28 using HTTP. When the user views the results we infer that the user is viewing the results on the display 14 (FIG. 1) such as the one described above. An output device may include sound-generating devices or a brail machine that is used to communicate NABMS information to the end user.

The disclosed NABMS includes the NABMS client 30 for interfacing with at least one user. The terminal used may be a standalone computer as described above or a "dumb" terminal where the CPU processing is done at a server. The NABMS client 30 may be any HTTP-aware browser such as those used in hand-held devices, Web pads, smart phones, interactive television, interactive game consoles, two-way pagers, e-mail only devices, or computers. The NABMS server may use any gateway product instead of CGI that incorporates for example "ACTIVE SERVER PAGES" from MICROSOFT, "JAVA SERVER PAGES" from SUN, or uses "COLD FUSION" from ALLAIRE to interface between the NABMS database server 38 and the NABMS client 30 so that HTML can be produced to display the results of the user's query to the NABMS client 30. The actual connection of the NABMS client 30 to the NABMS server 34 may by any method 40 used to transmit data including but not limited to ISDN, cable, telephone line to the Internet 28 or a local-area-network (LAN), wide-area-network (WAN), or medium-area-network (MAN) that is networked directly to the NABMS client 30. Wireless connections including microwave, radio frequency, and laser technologies may use the Wireless Application Protocol (WAP). A WAP gateway to a standard HTTP 1.1 server may be used to control how the network servers provide content to wireless devices, specifically using Wireless Markup Language (WML). This WAP gateway may be written using specifications from the WAP FORUM "WAP JUNE 2000 CONFORMANCE RELEASE".

A Reward Partner and Third Party Performance Program, discussed in later sections, connects to the NABMS server 34 through a Third Party Performance Server 42 and a Reward Partner Server 44, respectfully.

The Internet server 32, NABMS server 34, and NABMS database server 38 may be located in only one server that hosts all three components.

The NABMS is comprised of two main modules: (1) Parent/Teachers module and (2) Children's module. In the first module the parent/teacher (hereafter "PT") authors components of what the child will experience in (2) and is able to view the behavioral records of the child's performance. In the Children's module the child experiences what the PT has set up as behaviors to perform and differing reinforcing screens and reinforcers that are intended to increase the rates of positive behaviors for children.

Figure 3:
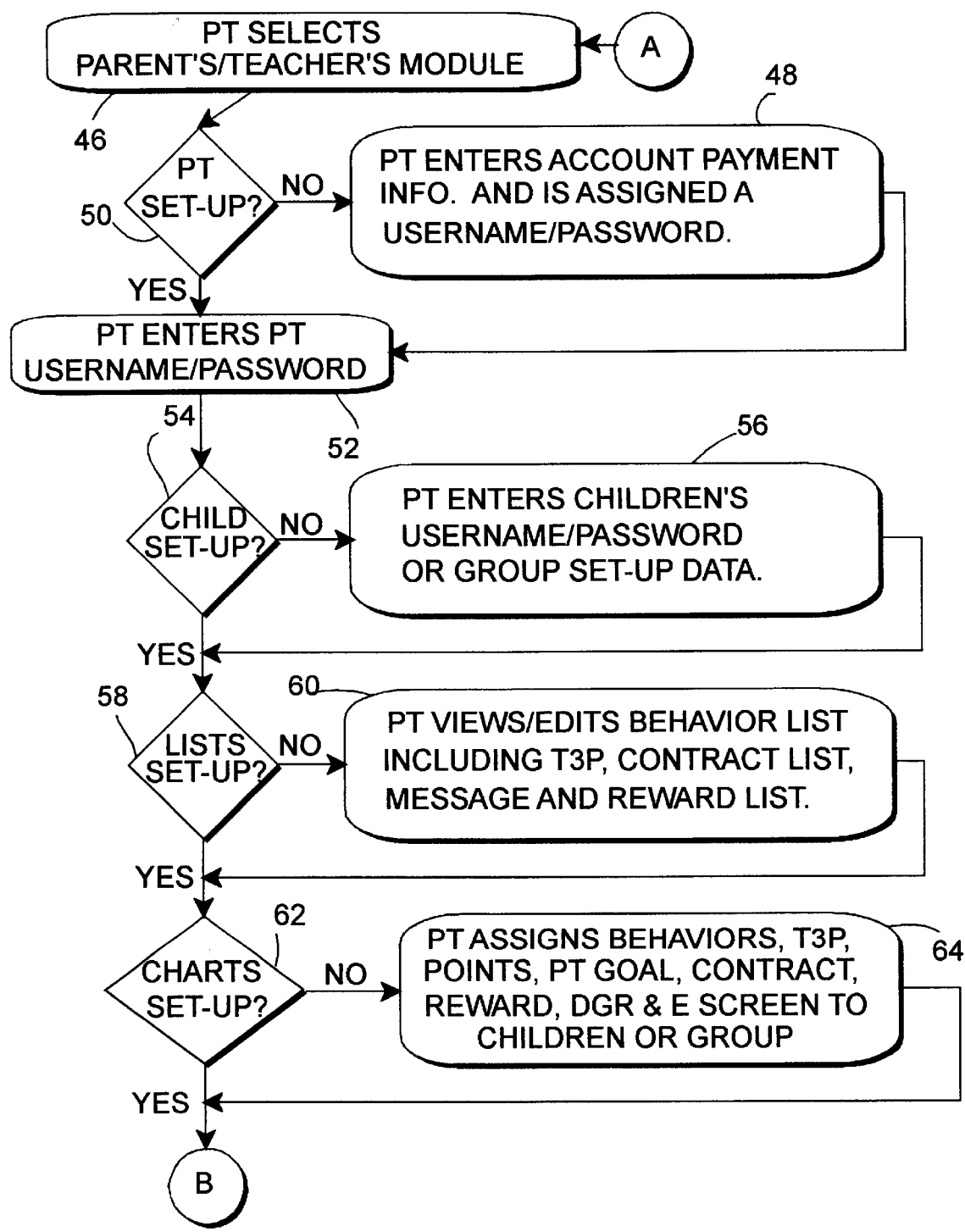
FIGS. 3–4 is a flowchart of the disclosed Parent/Teacher Module.
Figure 4:
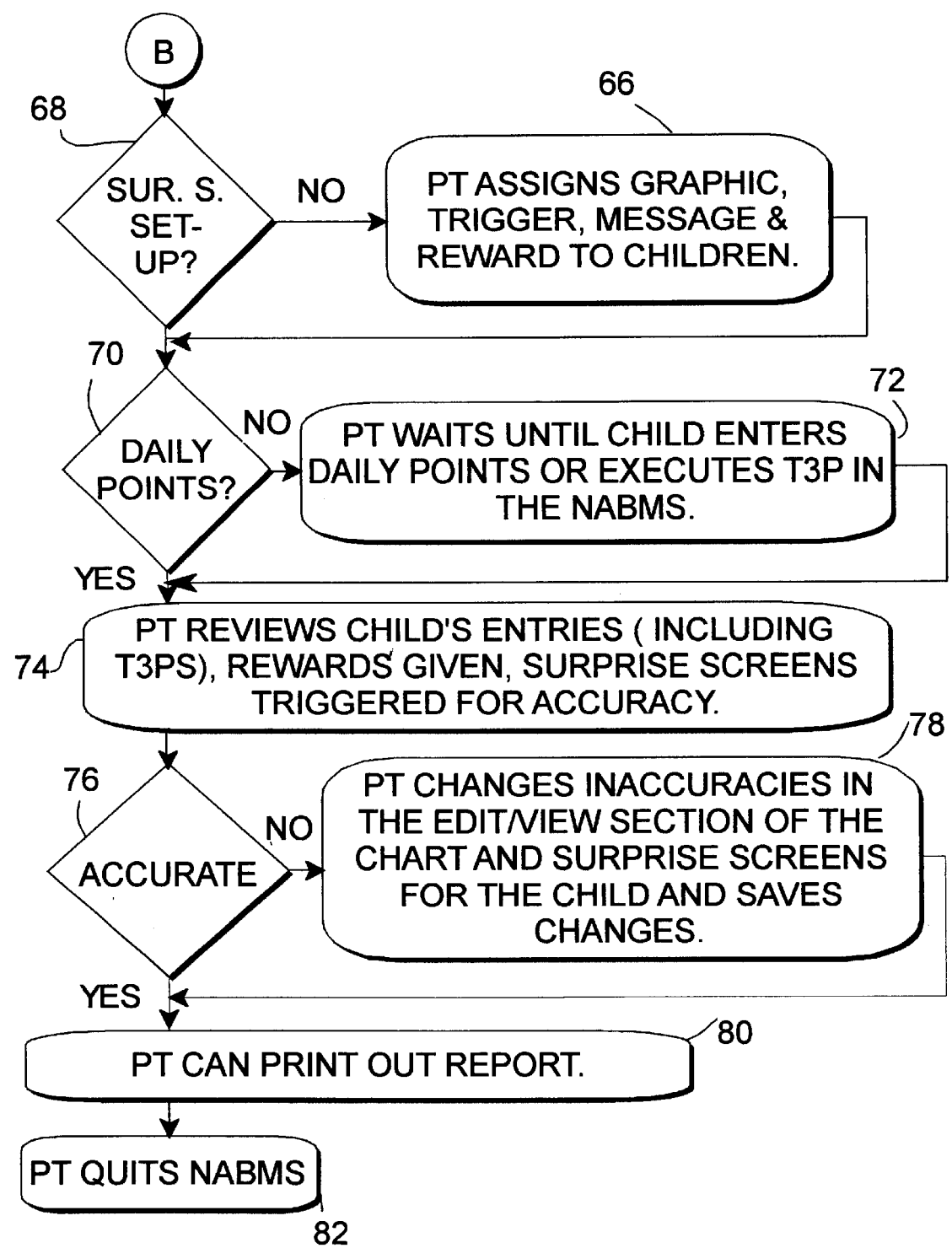

FIG. 3 and FIG. 4 illustrate the steps the PT follows to set up the NABMS and is comprised of the following sub modules: Account and PT password set-up, Children and Groups module, Charts module (including Chart Rewards and Edit/View Charts), Surprise Screens module (including Surprise Screen Rewards and Edit/View Surprise Screens), and Standard lists module.

The PT selects a Parent/Teachers module 46 from the main menu of the NABMS program. The PT may select a PT's Account and Password Set-up module 48, if the PT has not set up a NABMS program yet 50, by clicking on a UI WIDGET. The PT is presented with a series of fields to enter PT's name, address, e-mail address, number of children, and payment information using HTML to present the forms. PT selects a UI WIDGET to send data to the database 38 (FIG. 1) for storage and may use a processing payment information software package from "THE PROCESSING NETWORK" that processes the credit card, mails a receipt, prompts the user for a username and password, updates the htpasswd file (the file that restricts access), updates the expire file, runs a daily crontab that checks to see if users have expired and removes them from the password list.

The PT enters their username and password in a first page of a PT module 52. If the PT has not set up a identifier for the children 54, the PT selects a Children sub module 56 and inputs each child's first and last name, assigns a password, and retypes the password to confirm the accuracy of the entry. This setting up of the children identifiers will be discussed in more detail in a later section.

If a standard list is not set up 58, the PT selects a Standard Lists module 60, which sends a query to the database 38 requesting the four standard lists. The first list corresponds to the scroll-down behavioral list in the Charts module including third-party performance programs for particular children discussed in more detail below. The second list corresponds to the contracts used in the Charts module. The third list corresponds to the scroll-down encouraging Message List in the Surprise Screens module. The PT may select one of the lists by clicking on it with the cursor from the mouse 16 (FIG. 1). The list can be edited using the browser's built-in word processor. Finally the PT may select the UI WIDGET Save that sends the selections and entries by the PT to the database 38 (FIG. 2) for storage through the above-mentioned process. The forth list is a list of purchased rewards from which to chose. A UI WIDGET New Reward may be selected to purchase a new reward. This process is described in greater detail in a later section.

If a Chart is not set up 62 then the PT creates a new chart 64 by assigning behaviors, points, point goal, contract, reward, DGR screen and encouragement screen to a child, children or group and may print out a star chart for each child to place stickers on. This process is described in detail in a later section.

The PT may also select a third-party performance program as a behavior for a particular child. Hereafter, the term "Third-Party Performance Program" is referred to as "T3P". This ability to select a T3P from the behavior list may be dependent on the setting up T3Ps in the "Third Party Partners" section of the Parent/Teacher's Module discussed in a later section.

The PT may also select rewards from an electronic catalog in the NABMS system or from a reward partner such as an online toy store for a particular child. This ability to select a reward may be dependent on the setting up the "Reward Partners" section of the Parent/Teachers module discussed in a later section.

The chart's contract is in text-based form such as "When I earn 12 points I will get a deck of Baseball Cards." This text is generated from the entry of the point goal and by assigning the reward from the database 38 or text input by the PT and the resulting queries to the database 38.

As shown in FIG. 4, the PT selects a Surprise Screens module 66 if a surprise screen has not been set up 68. This sends a query to the database 38 (FIG. 2) requesting the names of the children who were previously entered in the database 38. The database 38 returns the names of the children, the name of the PT, and the current active charts. The NABMS client 30 presents this data in HTML format.

If a child has not entered his or her daily points 70 in the Database 38 (FIG. 2), the PT will have to wait to review a child's progress 72. The PT may enter the URL of the NABMS application main screen 46 (FIG. 3), after the child has entered daily points, to view or edit the child's chart or surprise screens. The PT then enters his or her user ID and password in fields presented 52 (FIG. 3) and selects a submit key with an input device such as the mouse or keyboard 16 (FIG. 1). The PT's user ID and password are compared against those submitted earlier and stored in the database 38 (FIG. 2). If the user ID and password match, the PT views the PT Main screen.

The PT selects a "View/Edit Charts" module 74 from the PT Main screen. The database 38 (FIG. 2) is queried and returns a list of all the PT's children in a pull-down menu. Also, a grid 7 columns by 5 rows may be shown to represent the 7 days of the week and the five rows of behaviors. In this grid the PT views the child's points earned and can edit the points if needed. Once a child has entered the points 72, the PT selects one of the children for viewing or editing. The Database 38 (FIG. 2) returns the start dates of all the current and past charts for the selected child in the form of a pull down menu in place of the "Start Date" field.

The following items are displayed: child's name, chart date representing the most recent chart, the list of behaviors associated with the previous chart, total point goal, reward, and the contract. Also on the screen is a grid of a week's behaviors and points, edit points, prev week, next week, cancel and save changes UI Widgets.

The PT may select a pull-down menu of chart dates and select a different chart date. The database 38 (FIG. 2) is queried and returns the data to view the records of a different chart for the same child. All the past records for the child or children may be retrieved from the database 38 (FIG. 2) and available for timely viewing. If a chart's information is inaccurate 76, the PT may change any of the behaviors, value, point goal, reward, contract, or daily points earned (displayed in the Points Earned grid) associated with a particular chart by entering a change or selecting an item from a pull-down menus 78. The PT may view a previous week's record of daily points by selecting the "Prev Week" UI Widget. To return to the this week's records, the PT may then select the "Next Week" UI Widget. The PT saves all changes by selecting the "Save Changes" UI Widget, which executes a CGI script and saves the changed records to the database 38 (FIG. 2).

The PT may select a different child's chart to view or edit by selecting from the pull-down menu of children's names. The PT can view or make changes as described above for this child's chart.

In the View/Edit Charts section, the PT may choose a print function that prints the entire history and data associated with a particular chart 80.

The PT selects the "View/Edit Surprise Screens" module 74 from the PT Main screen to view or make changes to a Surprise. The database 38 (FIG. 2) is queried and returns a list of all the PT's children in a pull-down. Also included is "Date Viewed by Child" and "Total Points Earned" for the chart that the Surprise Screen is attached to.

The PT selects one of the children for viewing or editing. The database 38 (FIG. 2) returns the start dates of all the current and past Surprise screens for the selected child in the form of a pull-down menu in place of the "S. Screen Date".

The following items are displayed: child's name, surprise screen date representing the most recent surprise screen, graphic, trigger, specific point, random or lottery, reward, message, the chart and chart ID the surprise screen is attached to, total point goal, date viewed by child (if viewed), and the "Cancel" and "Save Changes" UI widgets to save the child's changed records to the database 38. If performance is adequate, all the past records are retrieved from the database 38 (FIG. 2) and stored in the memory 18 (FIG. 1).

The PT may also select a different Surprise screen by selecting from a pull-down menu of Surprise screen dates of previously created Surprise screens associated with the child whose name appears in the child scroll-down menu. The PT may make changes to the graphic selection, the trigger, specific point for random and lottery %, and message. The PT may select the "Save Changes" UI widget to save the child's changed records to the database 38 (FIG. 2).

The PT may select a different child's name to view or edit his or her Surprise screens by selecting from the pull-down menu of children's names. The PT can view or make changes as described above for this child's Surprise screens.

In the View/Edit Surprise Screen section, the PT may choose the print function that prints the entire history and data associated with a particular Surprise screen 80. Finally the PT may exit a NABMS program 82.

Figure 5:
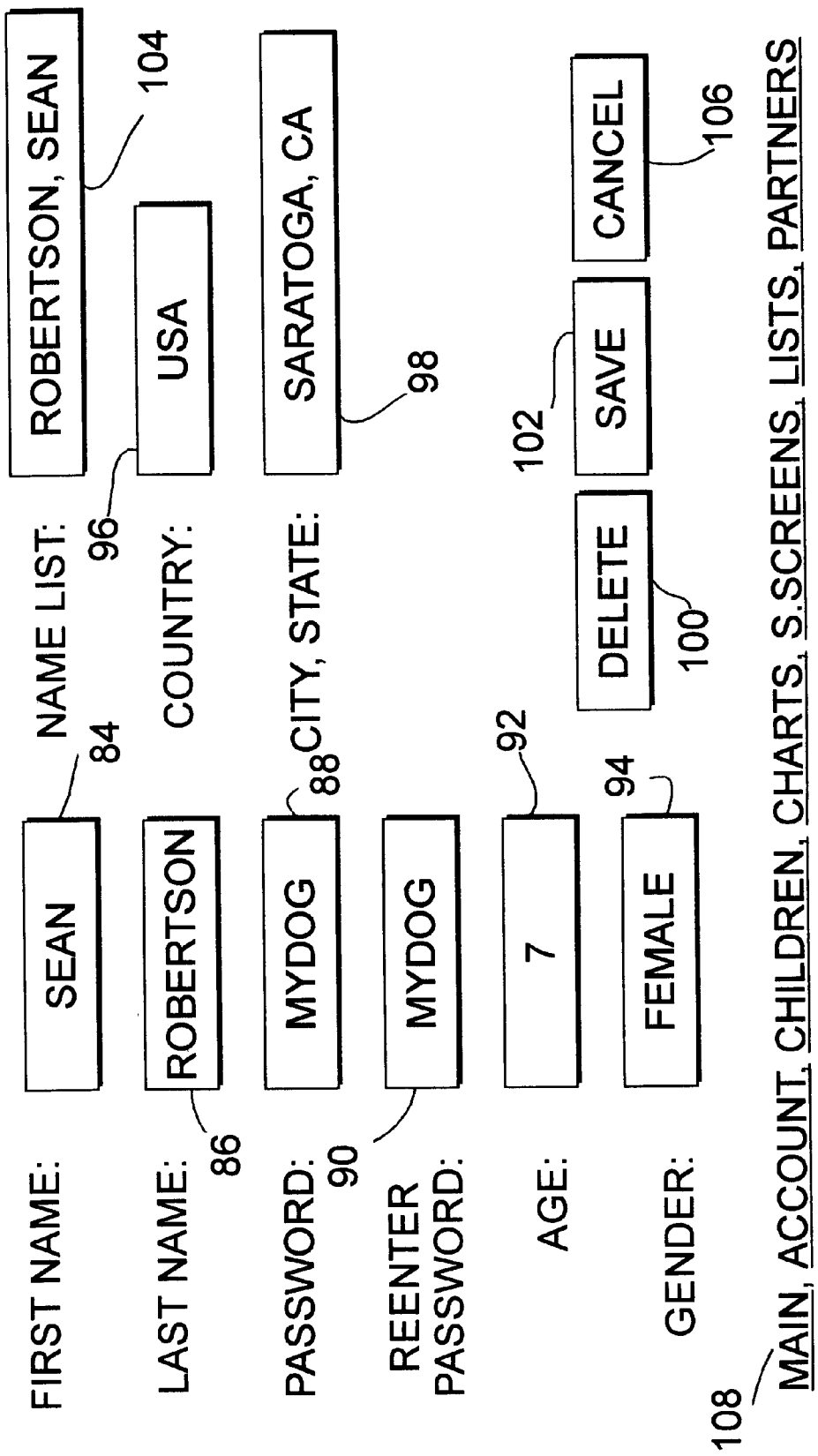
FIG. 5 is an example screen for setting up the child's name and Password.

FIG. 5 illustrates a client 30 (FIG. 2) interface for entering a child's name and identifiers for the NABMS. The PT may select the Children sub module 56 (FIG. 3) and inputs each child's first 84 and last name 86, assigns a password 88, and retypes a password 90 to confirm the accuracy of the entry. The PT also inputs a child's age 92, gender 94, country 96, city and state 98 using the client processor 12 (FIG. 1) to generate the HTTP protocol that allows for the storage in the database 38 (FIG. 1) as described above. The PT can also delete 100, and make changes and save them 102 in the fields by selecting the saved child's name from a pull-down menu 104 by using the standard update and delete database software calls. The PT can cancel any entries or changes by selecting a Cancel 106 UI WIDGET. At the bottom of the screen is a list of menu items 108 to help the PT navigate through the NABMS.

Figure 6:
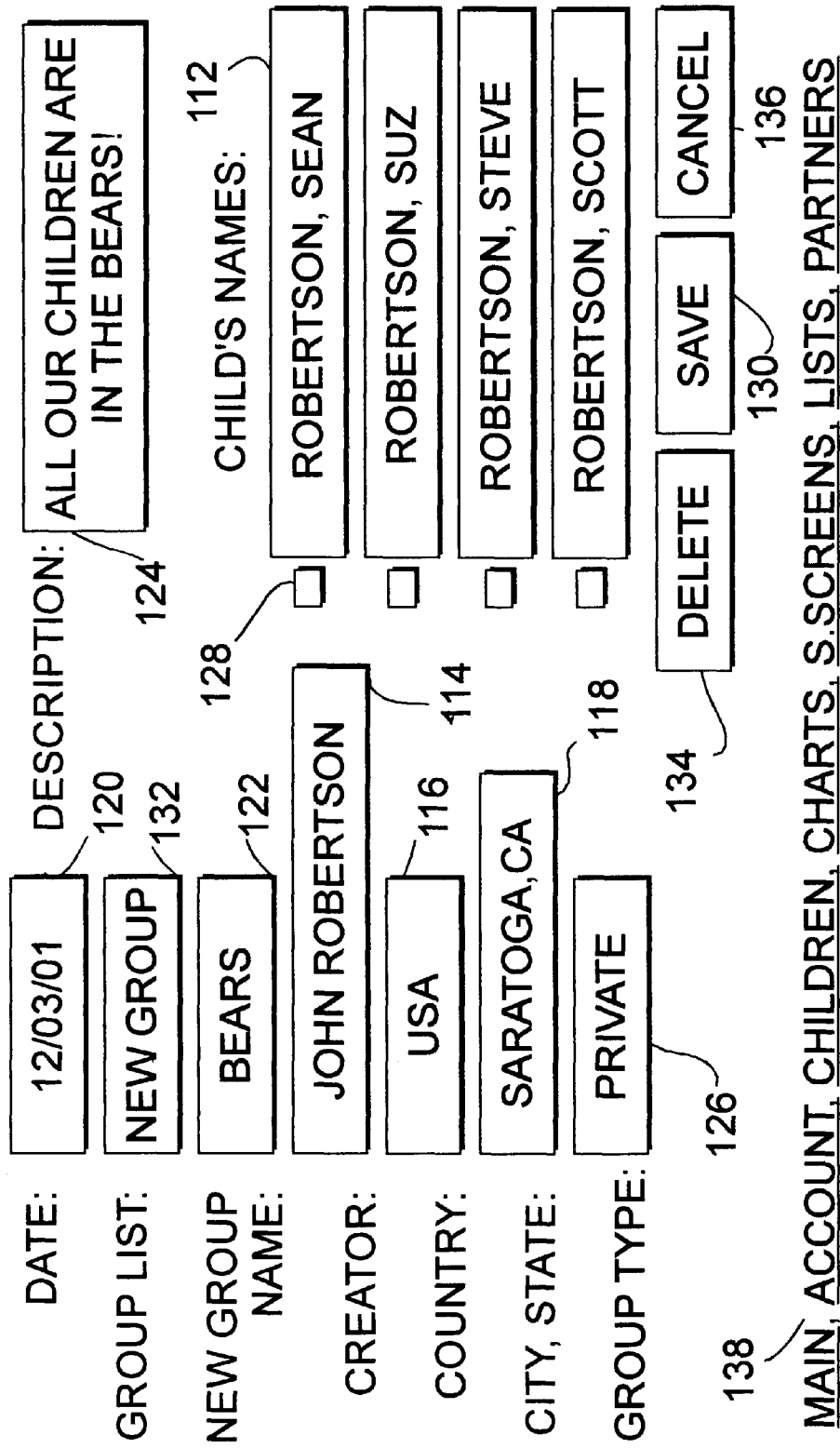
FIG. 6 is an example screen for setting up groups.

FIG. 6 illustrates a client 30 (FIG. 2) interface for setting up a new group. The PT may select "Groups" from the main menu. The current list of groups 110, children 112, a creator's name 114, a creator's country 116, and creator's city, and state 118 are queried from the database by the before-mentioned processes and are displayed 14 (FIG. 1). A CGI script may automatically enter a creation date 120 of a new group. The PT chooses a new Group name 122, enters a short description 124 of a new group, and selects from a pull down menu either "private" or "public" 126 for a new group.

If the entries in the Country, City, State, and Description fields are correct, the PT may assign his or her children to the new group by selecting a GUI check box next to each child 128. The PT may click a "Save" button 130 to send the data to the database 38 for storage. The PT may edit groups by selecting a "Groups List" pull-down menu 132 and selecting the name of the group that was previously created. The database is queried and returns the data for the selected group and presents it on the display 14 (FIG. 1). The PT may then edit the data and click a "Save" button 130 or click a "Delete" button 134 to permanently delete the group's data from the database 38 (FIG. 2). The PT may select a "Cancel" button 136 to return to the previous screen. On the bottom there may be a series of links for easy navigation through a NABMS 138.

Figure 7:
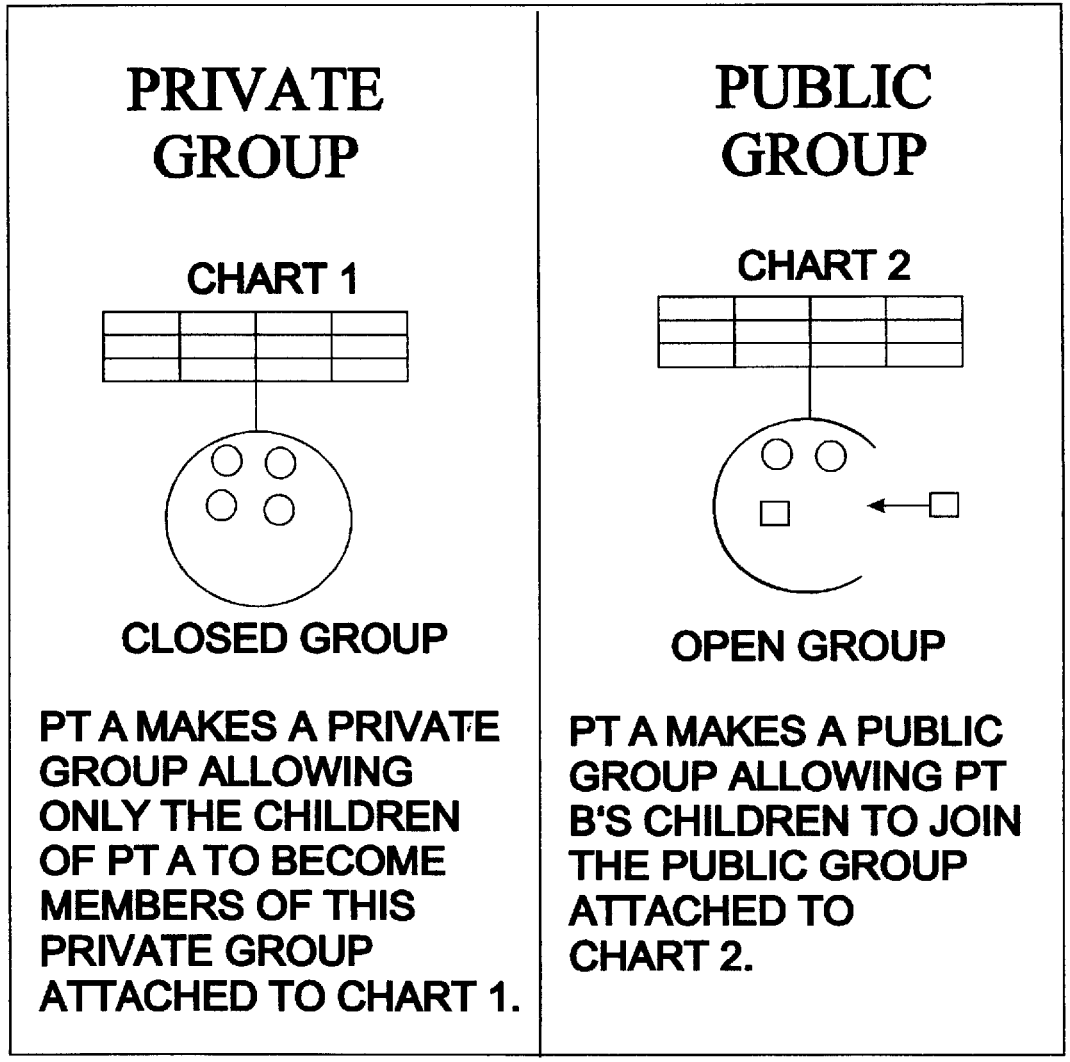
FIG. 7 illustrates two different group types.

FIG. 7 illustrates two different group types. Groups are either private or public. A public group allows children outside the PT's group to join if they know the public groups ID number. A private group is set up by a PT and only the PT's children can join.

Figure 8:
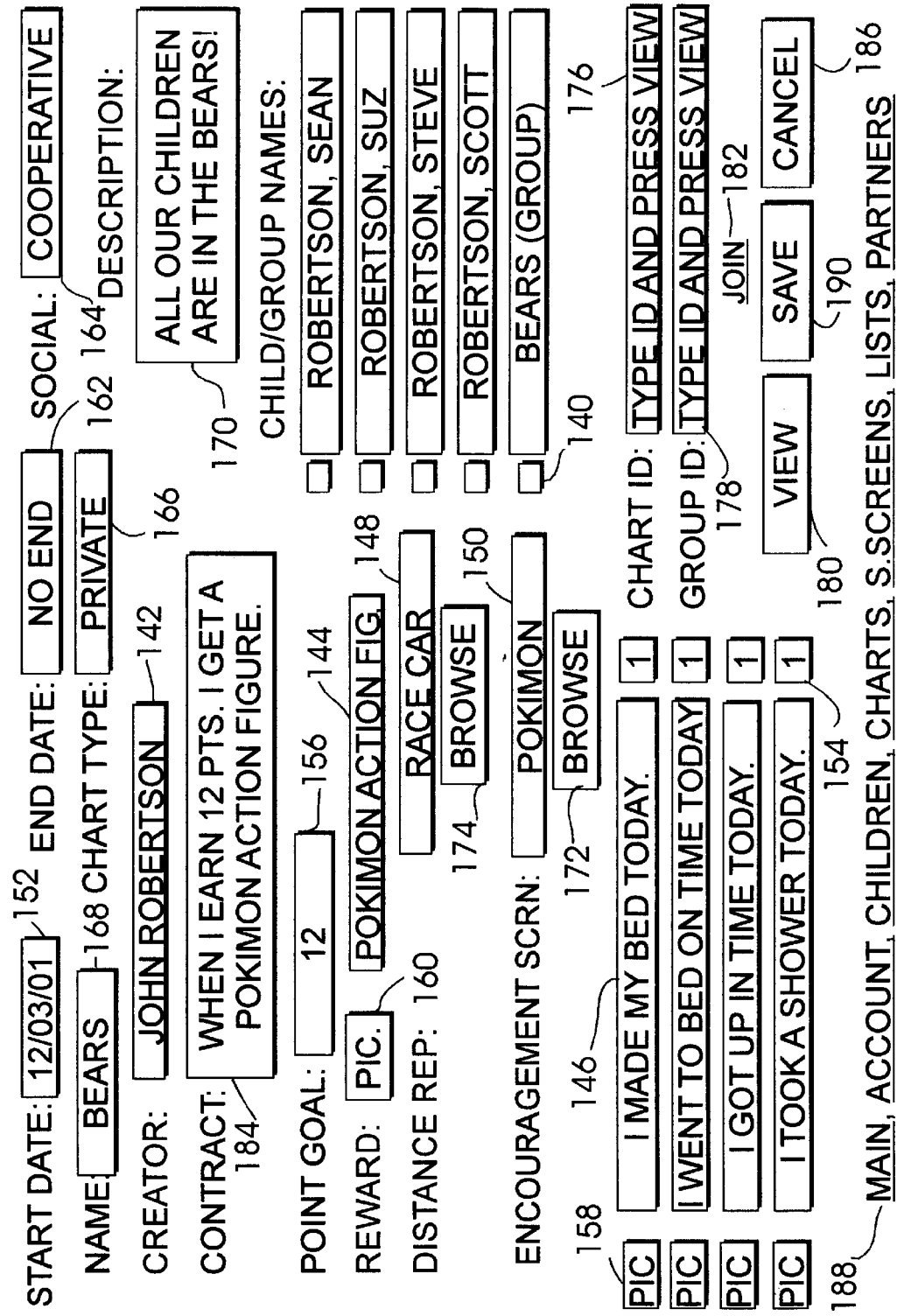
FIG. 8 is an example screen for setting up a new chart for a child or group.

FIG. 8 illustrates a client 30 (FIG. 2) interface for setting up a new chart as previously discussed. The PT selects the "New Charts" module 64 (FIG. 3), which sends a query to the database 38 (FIG. 1) requesting and displaying the names of the children and groups with a selectable GUI interface 140, PT's name or creator's name 142, rewards 144 (more detail below), behaviors in the standard list 146, Distance to Goal Representation screens 148 and Encouragement screens 150. The database 38 (FIG. 1) sends back the names of the children and the NABMS client browser 30 (FIG. 2) receives the list using HTTP protocol and presents the list using HTML. The PT may select a child, children, or group from the Child/Group list for which this same chart will be assigned. The PT may select the child or children by clicking on and highlighting each one using the GUI interface 140. A current chart date 152 is automatically generated with a CGI script and displayed on the monitor 14 (FIG. 1). The PT may select different behaviors for the child to perform from scroll-down lists of behaviors 146 called from the "Standard List of Behaviors" 60 (FIG. 3). For example, "I brushed my teeth today," "I went to bed on time today," "I got up in time for school today," and "I took a bath/shower today." The PT may modify the text by using the NABMS client's 30 built in word processor.

The PT then assigns a point value 154 for each behavior 146. The PT may assign 1 point for "I made my bed today" and "I was kind to my brother today." The PT may assign 2 points for "I remembered to take my homework to school today," depending on what weight the parent wants to give a particular behavior. This assigning of points may be done through the pull-down scrollable menu 154 adjacent to each behavior 146 with a list of points from 1 to 10. After assigning a point value to each selected behavior, the PT enters a point goal value into a Point Goal field 156. The PT could enter a point goal by using the pull down menu with values from 1 to 70 156. This point goal is the total number of points earned by the child before they can earn a reward.

For example, the PT enters the three behaviors above with the above point assignment. It is therefore possible for the child to earn 4 points per day. The PT may set the point goal at 12 points, which allows the child to earn a reward in as early as 3 days if all the behaviors are performed.

The PT may choose to associate a pictorial representation of a behavior for the child to view while he is entering his daily points. The PT may click on a UI widget 158 to browse for a graphic file in JPEG format, or a multimedia file in MPG format that represents the behavior and selects that file. The location of the pictorial representation can be saved to the database 38 (FIG. 2). This graphic or multimedia file is what the child views on the display 14 (FIG. 1) when the child is requested to enter his daily points. This display of behaviors may be a single or a series of pictorial representations on a single screen or multiple screens, for one or more behaviors.

The PT chooses a reward to motivate the child to perform specific behaviors. The reward representation can be as simple as a typed text representation of a reward. For example, "A new book!" may be typed into the text box 144. The PT may choose to associate a pictorial representation of the reward for the child to view by browsing for a pictorial or multimedia file to associate with the reward by clicking on a UI widget 160.

The PT may carry out the following steps to finish entering a chart for a child or children. The PT enters an end date 162 so the new chart will not allow any point entry by a child after a specific date or leaves it set as "No End Date" to give the child unlimited time to finish the contract. Next, the PT may select "Cooperative" or "Competitive" 164 and "Private" or "Public" 166 as described above, with separate pull down menus. The PT may enter a "Chart Name" 168 and "Chart Description" 170 in the respective fields. The PT may choose the "Distance Representation" 148 and the "Encouragement Screen" 150 from pull-down menus or use a common GUI interface button called "Browse" 172, 174 to search from a directory of files.

The "Distance Representation" 148 is a multimedia representation of how far the child has traveled on her way towards her point goal. For example, the "Distance Representation" might be a multimedia file of a runner powering to the finish line. The child has earned 6 points of the 12 point goal and will view half the distance of the race to the finish line. This "Distance Representation" presents to the child a concrete allegory of his own race to the finish of his contract. This is reinforcing and motivating for the child. The "Encouragement Screen" 150 is shown as a multimedia file to encourage the child to keep going and finish the contract. It may be something the PT created or something the PT downloaded from the NABMS site. The differing components of the Child module may be presented as a unified theme such as a favorite cartoon character theme. The child may be able to choose the theme at the beginning of the child module from a list of themes thereby making the presentation more reinforcing to the child.

The PT may also type a Chart ID 176 or Group ID 178 of the respective chart or group that the PT may want to join. The Chart ID and Group ID are automatically generated by the NABMS database 38 (FIG. 2) as unique auto-number identifiers and serve as primary keys of the record every time a chart is created or a group is attached to a chart. The PT may select "View" 180 to query the NABMS database 38 (FIG. 2) to return the data for a particular chart or group ID and enter it into the respective fields for viewing.

The PT may also want to select another PT's saved chart to join. In this case the PT may click a "Join" button 182 and is passed to a screen with lists of chart names with start dates and end dates that have been posted to join. The PT may select a chart that is interesting and will be passed to a screen with the chart's description, creator, creator's e-mail address, city, state, and Country, other PTs and children who have joined, chart ID, and group ID. The PT may select another PT's chart to join by selecting the "I want to join" UI WIDGET and is passed back to the "New Chart" page with the other PT's chart data already entered.

The PT can edit only the reward 144, Distance Representation screen 148, Encouragement screen 150, and a contract 184. Editable fields are allowed because of differing PT resources for rewards. However, the PT may choose to keep all entries the same. The PT must select which children or groups to add to this chart to join. The PT may select "Cancel" 186 at any time in the new chart and return to the previous screen. The PT may also navigate by using a menu list 188 at the bottom of the screen.

The PT may select a UI WIDGET "Save" 190 that sends the selections and entries to the database 38 (FIG. 2) for storage through the above-mentioned process.

Figure 10:
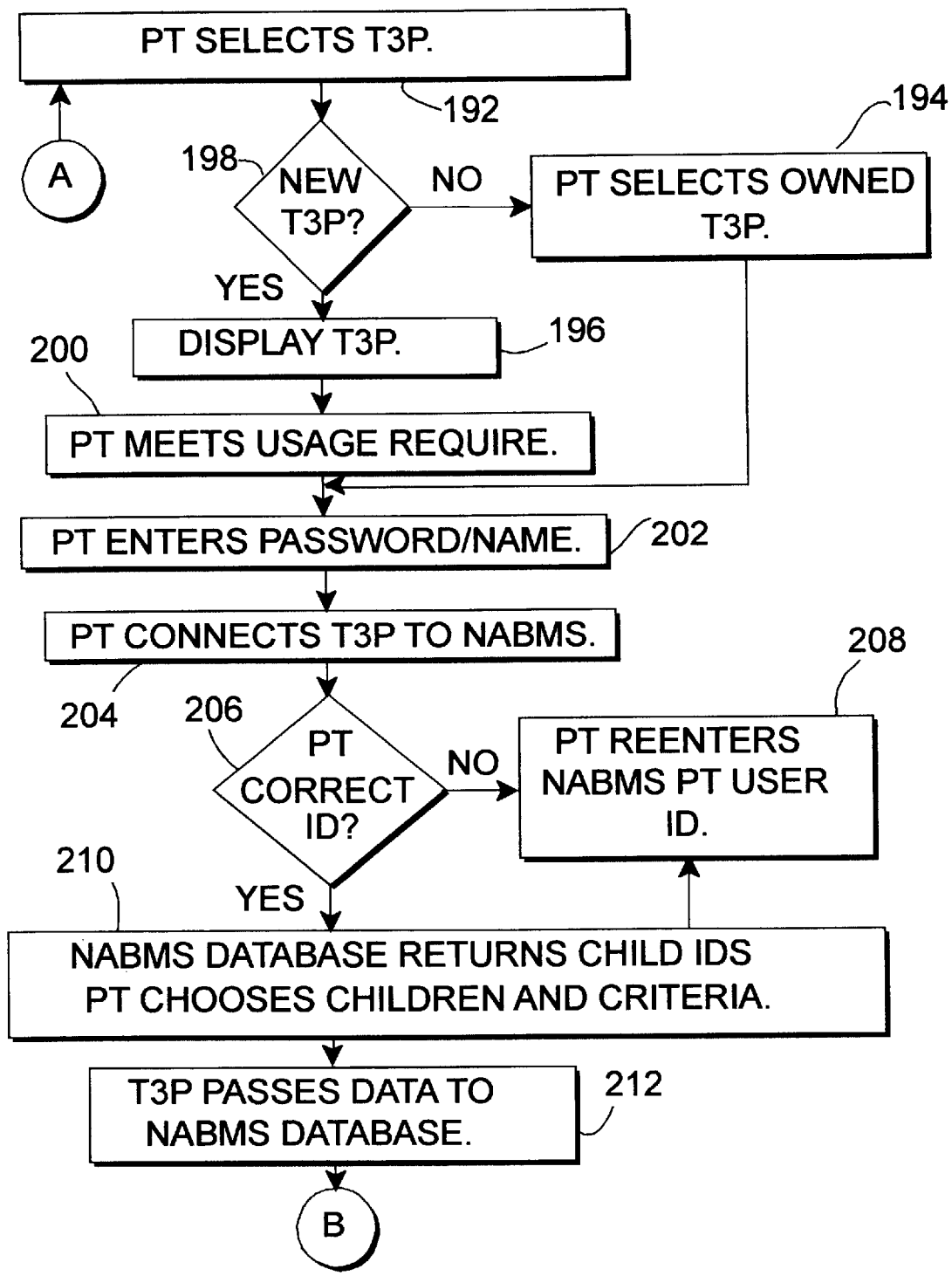
FIGS. 10–11 is a flowchart of the disclosed Third Party Performance Program component.
Figure 11:
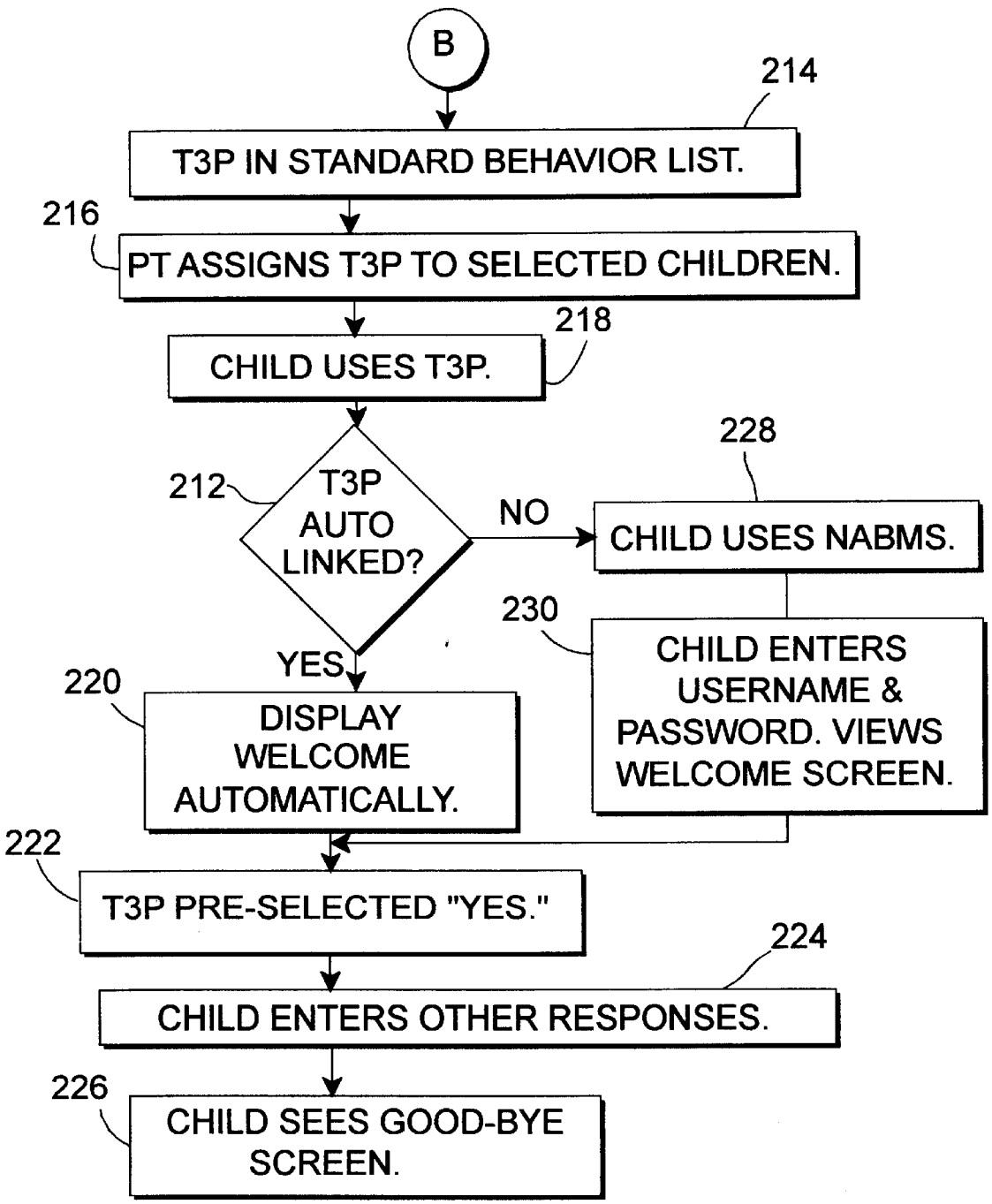

The PT may now be presented with a dialog box that asks if the PT wants to post the new saved chart for other PT's children to join. If the PT selects the UI WIDGET "yes," he or she is passed to a page that illustrates what other PTs will view when selecting the PT's chart to review for joining. The PT may enter additional information on the page and is given the choice with UI WIDGETs to "Post" or "Cancel." As mentioned earlier, only public charts or groups can be posted for others to join. An error message will appear if the PT tries to post a private chart or group. One exception is when a PT creates a private chart but attaches a public group. In this case another PT can join the public group but cannot attach another group or individual child to the other PT's private chart (FIGS. 10–11).

After the posting choice the PT is presented with a dialog box that asks if a "Star chart" be printed for each child assigned to the chart. If the PT selects "Yes," the database is queried and behavior records are printed in rows on the left-hand side and the days of the week are printed at the top of the columns. For example, if three behaviors are assigned for a group of children, a "Star chart" would be printed with a total of 21 cells (3 rows and 7 columns for the days of the week). The child could manually put stickers on the "Star chart". This feature allows for additional reinforcement and is an automated feature of the NABMS. One skilled in the art would understand the process and be able to generate the computer software for printing out the "Star charts."

The PT may create a chart using three different choices of member elements: private or public, individual or group, and cooperative or comparative. There are eight unique combinations of these elements for a chart.

Figure 9:
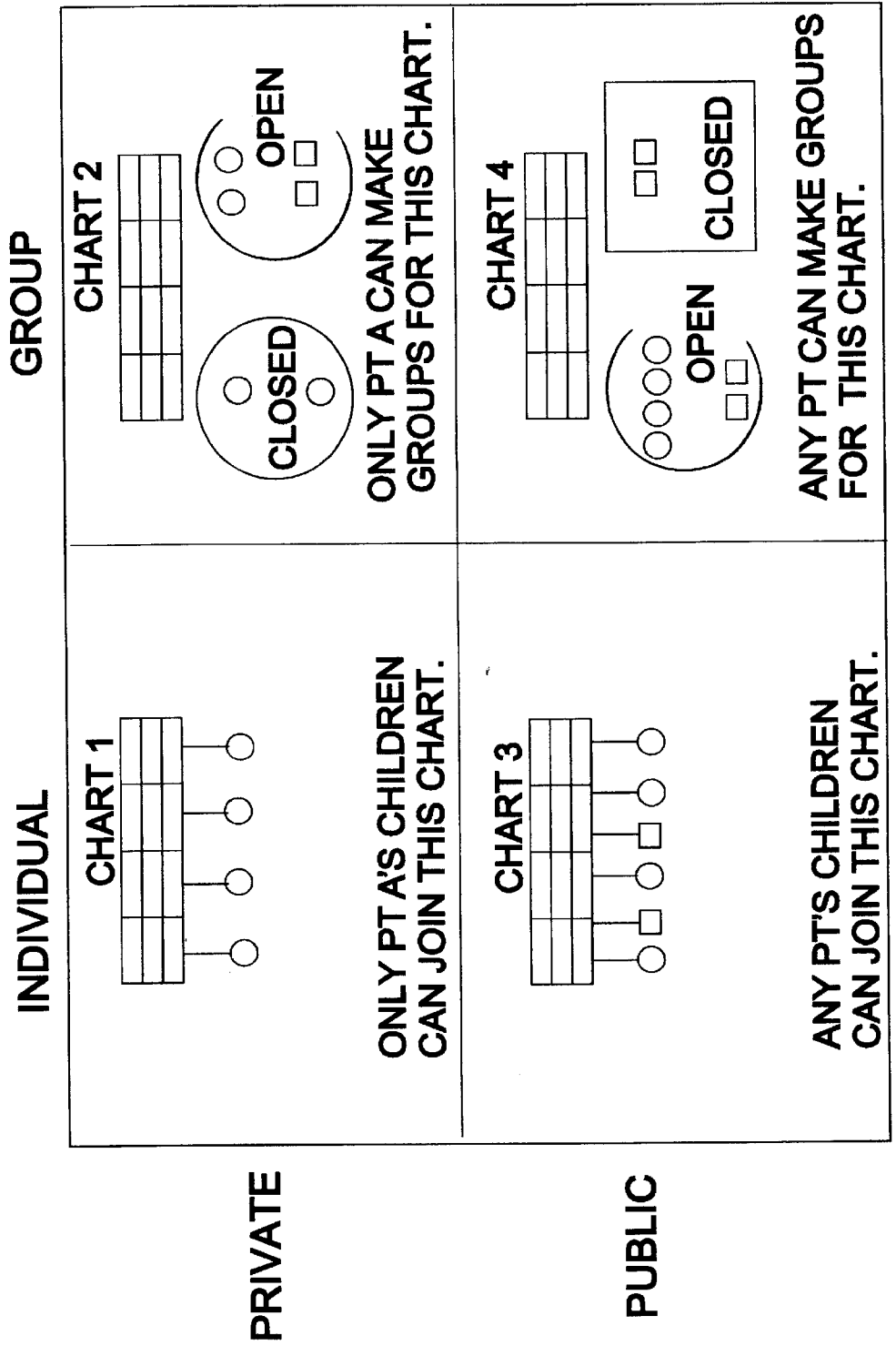
FIG. 9 illustrates four different chart types.

FIG. 9 illustrates differing chart types. The first combination is the choice between a private or public chart as illustrated in 166 (FIG. 8). A private chart is under the local control of the PT. A public chart can be joined without permission by another PT's children if they know its chart ID.

The second choice is between an individual or group Chart. Only individual children can join an Individual Chart. In an individual chart each child's performance is measured separately. A group's performance is based on averages of the individuals in either average percentage or average points earned by the members. Each member, however, can view his own contribution to the group. An illustration of choosing groups for charts is shown in 140 (FIG. 8).

The third choice, not shown in FIG. 9, is between the cooperative or comparative chart 164 (FIG. 8). In a cooperative chart the members or groups only know their own performance. In a comparative chart the members or groups are ranked according to performance and can view other children's rank.

One unique chart is the private chart with a public group. One PT creates this chart's group. However, because this group is public, other PT's children can join it if the other PT knows the group's ID.

Charts may be saved as a template to be used later for assignment to children if the chart ID is known.

FIG. 10 and FIG. 11 illustrates the steps a PT takes to incorporate a T3P into the NABMS. The PT may select "Third Party Partners" 192 from the main Parent's Membership screen. The PT may be presented with separate items such as "Search My Computer", "4 years to Kindergarten," an age or a grade range. The PT then selects one T3P from a list of T3Ps associated with the before-mentioned items. The PT may have already set up a T3P in an earlier session but had not assigned it as a behavior for a particular child 194.

The PT is then linked to a particular location or site of a T3P 196, which may reside on the PT's computer, a LAN or WAN, or another site. If a T3P is not owned 198, the PT will meet the requirements for usage, such as on-line payment for using a particular T3P 200. The PT is assigned a T3P username and password. The PT then enters a correct T3P username and password 202 and is given a choice of linking the T3P with a NABMS 204. The PT may select the UI Widget to indicate that choice as "yes." The PT may identify himself by imputing his unique NABMS sign in member name and password during a secure connection in a section of a Third-Party Performance Program site 206, 208. The NABMS database 38 (FIG. 2) is queried and a list of the PT's children is displayed 14 (FIG. 1). The PT then selects which children to assign to a T3P and acknowledges or sets a "criteria for success" 210. This "criteria for success" may be supplied by the third-party such as the completion of a level in a math-tutoring program. The PT may set the "criteria for success" from a number of choices given to the PT by the third party. The PT may choose to have the child's NABMS module linked to the finishing of a T3P by the Child so that the child views the NABMS upon finishing the performance of the T3P .

The database 38 (FIG. 1) records are updated to indicate this assignment of a T3P as a behavior associated with a particular child 212 in a Standard lists 214. The PT assigns this T3P behavior to the assigned child's chart during a new chart setup 216.

The child may then use a T3P program 218. After finishing a T3P session and earning completion points or performance points the child may be linked directly to a Child's module "Welcome" screen of a NABMS 220. Going through the NABMS Child's module after finishing the T3P may immediately reinforce the child. The child may view a behavior answer for the T3P as pre-selected to "Yes" 222 and will finish entering answers to other behaviors to finish a child's NABMS session 224. The child finishes a Child module and sees a Good Bye screen 226.

The Child may finish a T3P session at home or at another location 228. Later, the child may sign-in to a child NABMS module at a different location 230 and views the points that were automatically entered for that particular T3P session behavior through a pass of data directly from the T3P program to the database. This passing of data between servers is the same as previously described in the General Hardware section.

The T3P program may reside on a local area network or on the child's computer.

As stated before, one skilled in the art such as database software engineer would understand the process and be able to generate the computer software for the user parent, teacher, child and the NABMS administrator interface, the networking and database processing for the NABMS and the third-party performance programs using existing off the shelf developer software.

Figure 12:
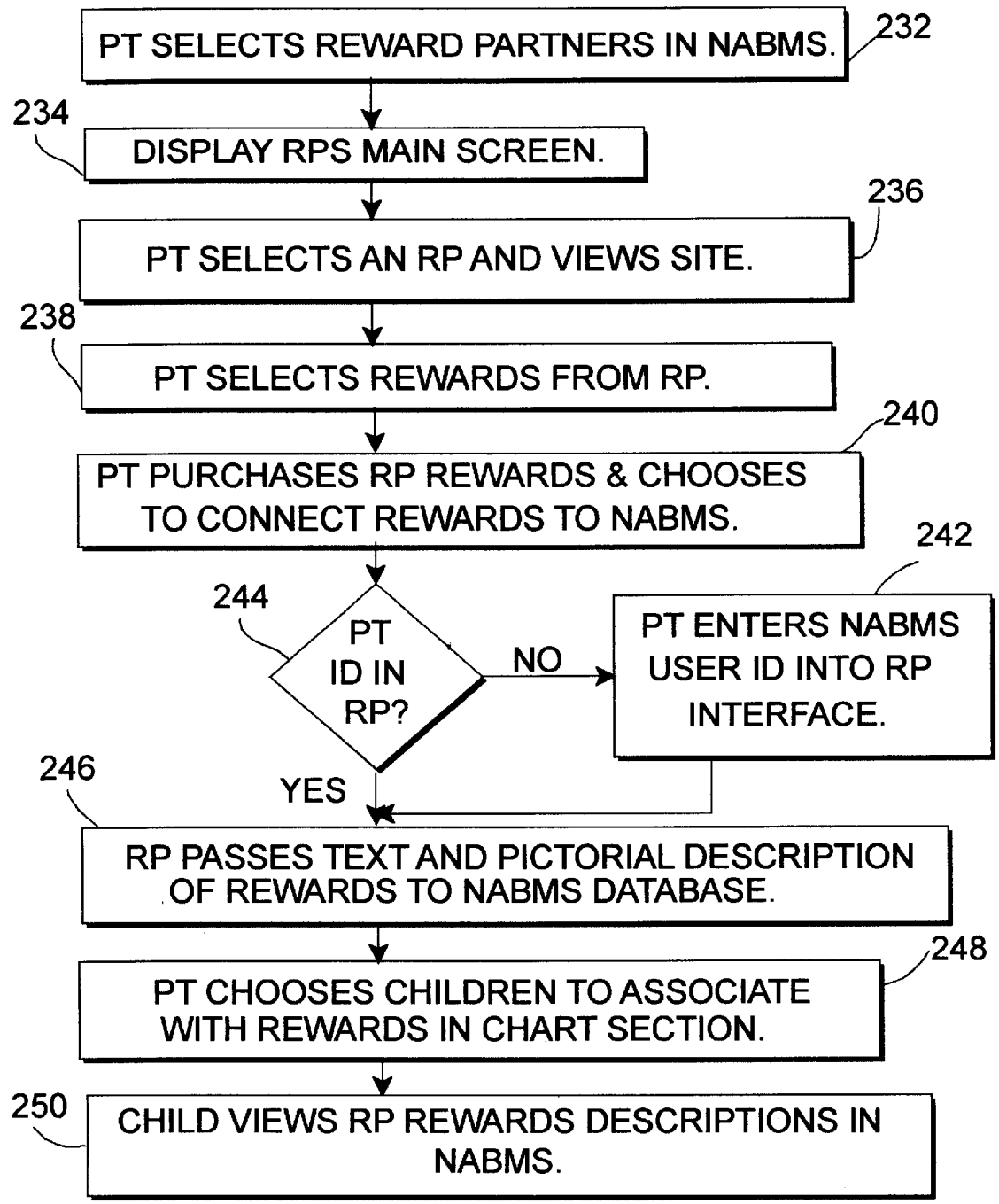
FIG. 12 is a flowchart of the disclosed New Reward component.

FIG. 12 illustrates the steps in the "Reward Partner" process. First, the PT may select "Reward Partners" from the main Parents Membership screen or select "New Reward" from the reward selection in a Charting section 232. The PT may be presented with a list of links to a number of "Reward Partners," hereafter known as an RP 234. The PT selects an RP to view 236.

The PT is then taken to the RP's particular site, meets the requirements for using the RP's site, chooses a reward 238, makes payment, and is given the choice of linking a RP with a NABMS 240. The PT may then select the UI Widget to indicate that choice as "yes." The PT is then automatically linked to the NABMS site and then must identify herself by entering her unique NABMS sign-in member name and password during a secure connection 242 if a sign-in member name and password have not been saved in a session 244. The purchased list of rewards in the form of text and pictorial descriptions is passed to the NABMS database 38 (FIG. 2) for storage and added to a "reward chest" 246 for that particular PT. Later when the child views the contract and reward section of the Child's module, he or she will view the motivating text and pictorial description.

The PT may then select the reward from the drop-down list of possible rewards 144 (FIG. 8) by clicking on a UI widget and associate a reward with a particular chart and assign it to a particular child 248. When the child uses the NABMS Child's module, she views the reward text and graphic on her display 250. When the child earns the point goal, the reward is removed from the available rewards in the NABMS database 38 (FIG. 2).

Figure 13:
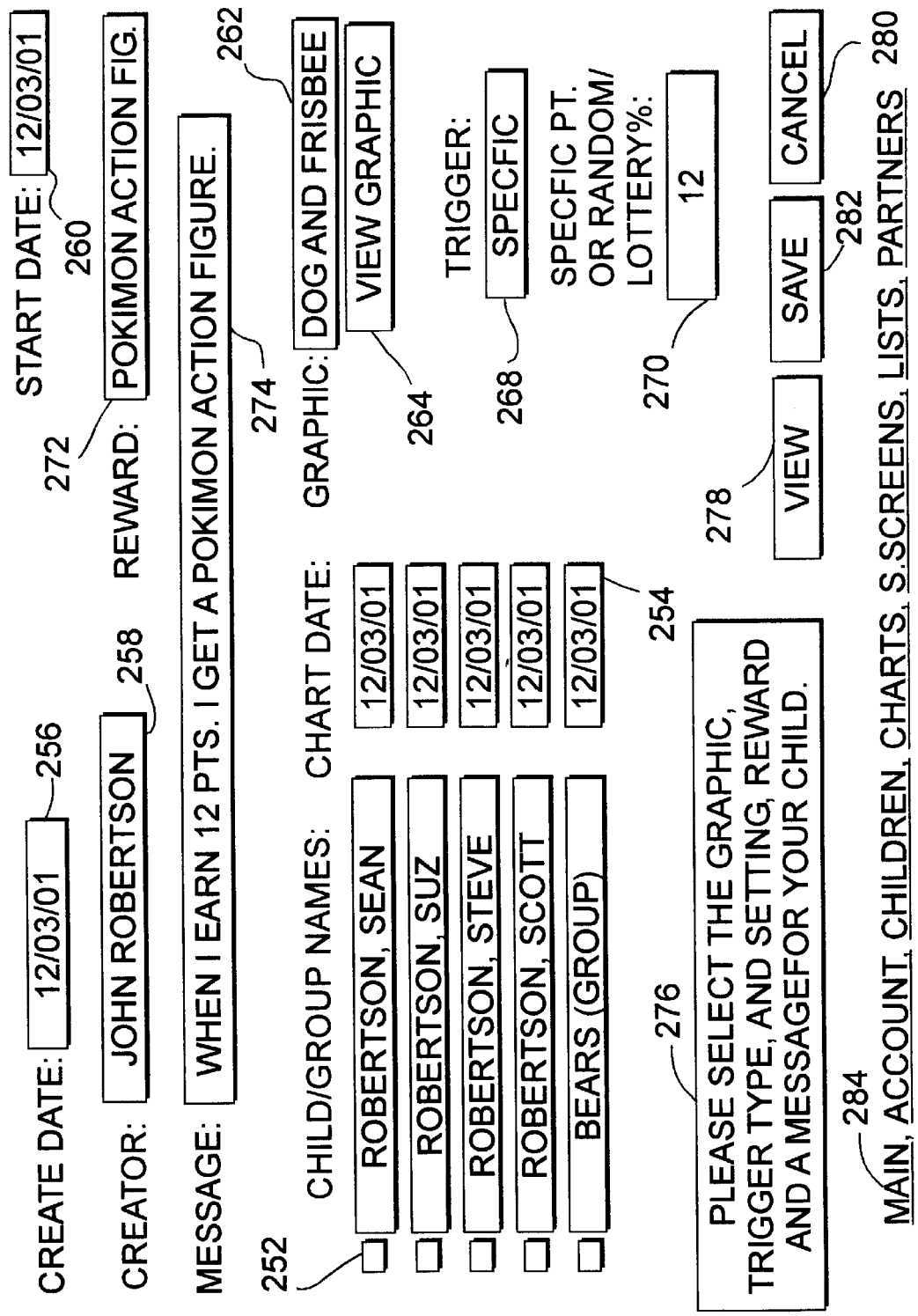
FIG. 13 is an example screen for setting up a New Surprise Screen for a child or group.

FIG. 13 illustrates a client 30 interface for setting up a new surprise screen as previously discussed. The PT may select a child or children from a Child list 252 for which the Surprise screen will be assigned. The PT may select the child, children, or group by clicking a check box.

The PT may select a particular chart to attach to the new surprise screen by selecting from a "Chart Date" pull down menu 254 of current active charts in the PT's NABMS for the selected Child or group. The New Surprise screen will be attached to the Child's, or group's chart selected by the PT. A current Surprise screen creation date 256 is automatically generated with a CGI script and a PT's name appears in a "Creator" field 258 on the monitor 14 (FIG. 1). The PT may also select a "Start Date" 260, which determines when the new surprise screen becomes active.

The PT may select a graphic in JPEG format or a multimedia file in MPG format through a scroll-down menu of graphical items 262. The PT may also view the graphic on the display 14 (FIG. 1) by clicking on "View Graphic" 264 after browsing for a particular graphic file by clicking on "Browse" 266. This pleasing graphic or multimedia file is what the child views on the display 14 (FIG. 1) when the Surprise screen is triggered. The PT then selects the type of trigger for the Surprise Screen. From a scroll down menu a PT can select Specific, Random, or Lottery 268. Specific means that a Graphic and text appear when the child earns a specific amount of points. For example, when the child earns 5 points, the Surprise screen opens to reinforce the child's positive behaviors.

Random means that the PT can choose a percentage of chance that the surprise screen will appear as long as the child earns at least one point during the day. Lottery means that all the children who are currently using the NABMS will be chosen at random for the one Surprise screen as long as they earn at least one point per day. The PT selects from a pull-down menu the number of points, or a percentage of randomness, or a percentage of randomness for all the children currently using a PT's NABMS 270. The PT can choose a reward from a Reward list 272 similar to the Reward list 144 (FIG. 8) found in the Chart section above. The PT selects an encouraging message from a scroll-down menu or edits a message 274 by using the built-in word processor in the browser. For example, the PT could choose from the following encouraging statements: "You are doing great. You get to stay up one half an hour later than usual tonight." "I'm really proud of your hard work. You get your choice of dinner tomorrow night." "You are really close to your goal. Keep it going! I'll do your chores today!" The PT may also view help notes 276 on the screen that provide some direction for the PT to use the new surprise screen set-up.

The PT may select a UI WIDGET "View" 278 to see exactly what the child will view on the monitor when the Surprise screen is triggered. This ability to preview the Surprise screen is important so that all files selected can be opened from the NABMS client. The PT may select "Cancel" 280 to return to a previous screen or "Save" 282 to send the selections and entries to the database 38 (FIG. 2) for storage through the above-mentioned process. The PT may also navigate by using a menu list 284 at the bottom of the screen.

Figure 14:
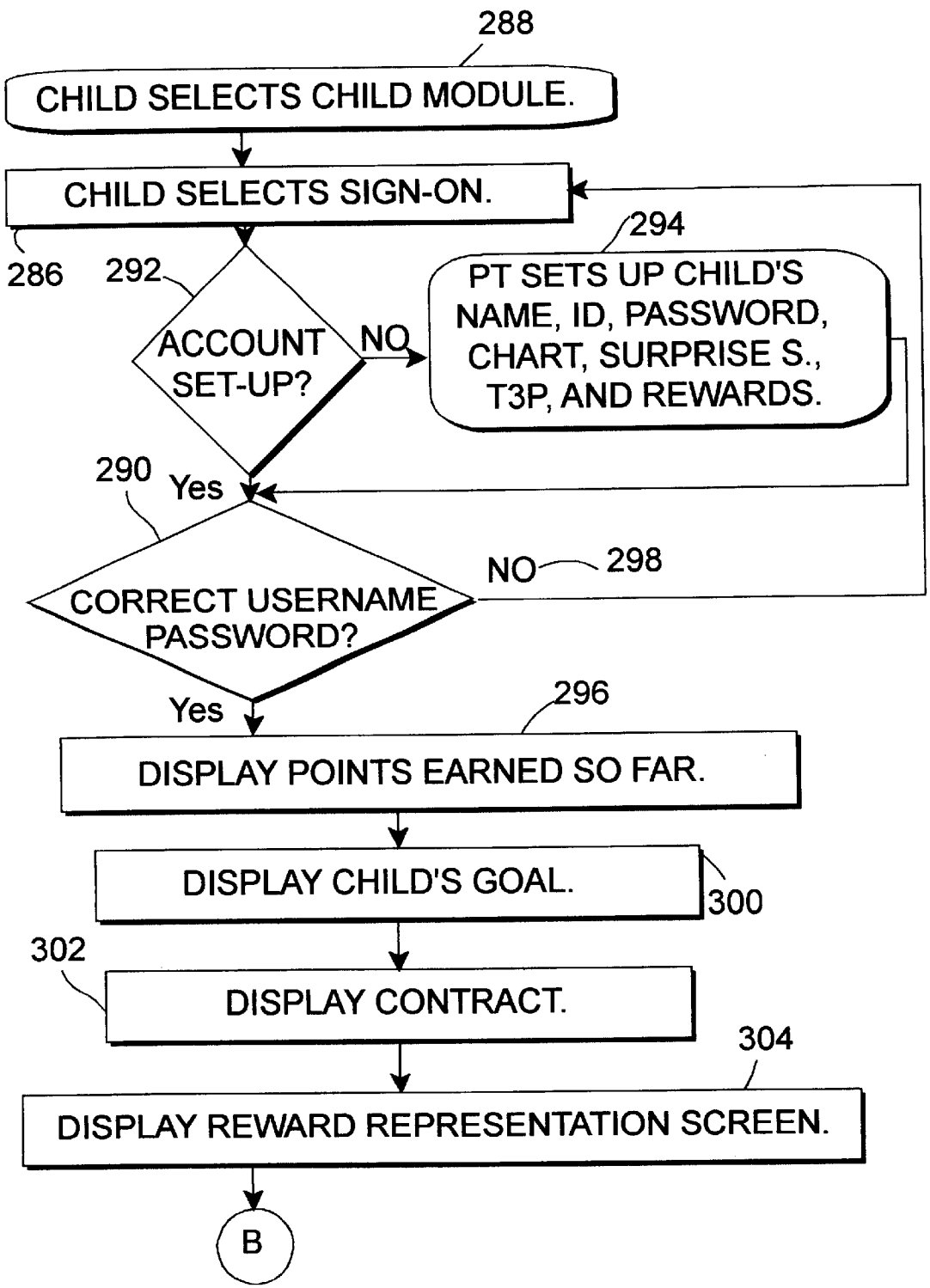
FIGS. 14–15 are flowcharts of the disclosed Child Module.
Figure 15:
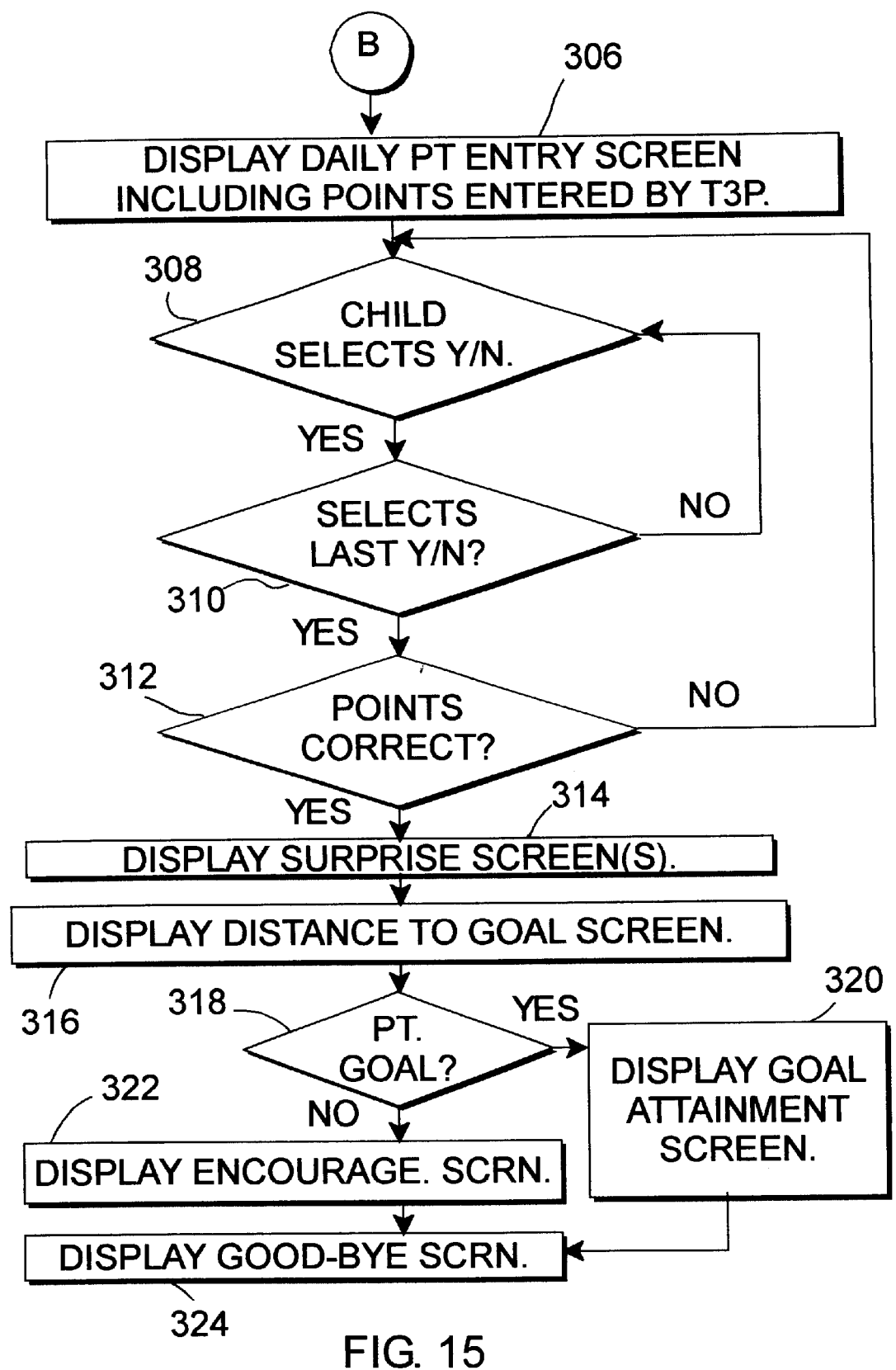

FIG. 14 and FIG. 15 illustrate the steps the child takes when using the NABMS. The Child's module as seen is comprised of the following submodules: Sign-On, Points Earned So Far, Your Point Goal, Contract & Reward Representation screen, Point Entry screen, Surprise screen(s), Distance to Goal Representation screen, Goal Attainment screen, Encouragement screen, and Good Bye screen.

The child may select a "Sign-On" module 286 by selecting an appropriate URL on a main page of a Children's module 288. The child enters a username and password 290 set up by a PT 292, 294 and stored in the database 38 (FIG. 2). The child selects an entry button or key and sends the entered username and password to be compared using a CGI script. If the username and password match those entered by the PT, the database is queried and a total number of points earned so far is returned, formatted, and displayed 296 in HTML format. If the child enters the wrong username or password, he or she is returned to a "Sign-On" module and given an error prompt 298.

The child may use the mouse or other input device to send HTTP protocol to advance to the next page and simultaneously query the database to return the child's data. In this example, the child's points earned so far 296 are returned and displayed for the child to view followed by a child's current point goal 300. The child may see a phrase such as "You have earned 7 points so far," followed by "Your goal is to earn 15 points! You can make it to your goal!" An audio file may also be used.

Using the same process the child views a Contract screen 302, followed by a Reward Representation screen 304 where a phrase and returned data displays: When (child's first name) earns (point goal), (child's first name) will get (text of the selected reward from the reward database and a pictorial file representation of the reward). Text, graphics, and sound may be viewed and listened to simultaneously. The graphic file may be a picture in a format such as jpeg or a multimedia file such as avi or mpeg.

Next the child may select an input to pass to the next page, the Point Entry screen. The child may view on the display 14 (FIG. 1) a list of behaviors that have been set up by the PT. The child may also view points already entered by their usage of a T3P 306. The child may select a response of yes or no 308 to each behavior by means of the input device 16 (FIG. 1). The child may enter an answer for a last behavior 310 and press a UI WIDGET to save the responses to performance for each behavior. A dialog box may appear asking if the child has made any mistakes during a entering of responses 312. The child may be returned to the original response screen if the child answers "yes" to having made a mistake.

When the PT has associated a pictorial or multimedia representation with a behavior the child may then select the UI widget indicating performance or click on the behavioral representation itself. Clicking on the pictorial or multimedia representation may change the appearance, e.g. shading, to indicate to the child that the graphic has been selected to represent the child has answered "yes" the question: "Have you performed this behavior (pictorial representation) today?" The child may then re click the representation to deselect it and return the representation to its original state, e.g. shading, if a mistake was made selecting the behavioral representation.

If the child selects "no" response mistakes, this sends the child's data to the database 38 (FIG. 2) to be stored. This updates the total points earned and queries the database 38 (FIG. 2) for any pending Surprise screens that have not appeared and compares the total points earned, the trigger type, the Specific, Random, or Lottery settings and possible Group Surprise screen(s). If the total points earned are equal to or greater than the specific triggered Surprise Screen(s) or the percentage of randomness is met, the database 38 (FIG. 2) is queried to return the graphic location and reinforcing text. A Surprise screen is displayed 314 and the database 38 (FIG. 2) is updated to indicate that the Surprise screen has appeared.

The child may select an input like the keyboard space bar to go to the next page, a "Distance to Goal Representation screen" 316. This is a multimedia representation of how far the child has gone and how far ahead the goal lies. For example, an overhead view of a track with a runner approaching the finish line would represent the ratio of the total points earned to the point goal.

If a total points earned is equal to or greater than a point goal 318, an Attainment screen opens 320. The database 38 (FIG. 2) is queried to return the location of the attainment graphic, the text of the contract, and the graphic or text representation of the reward. This information is displayed for the child to view.

If the child has earned less than a point goal, an Encouragement screen 322 opens. The Encouragement screen displays a multimedia presentation that is reinforcing and encouraging to the child. Different Encouragement screens can be displayed according to the percentage of completed behaviors for that day and how close the child is to the point goal.

The child may be given the option to print a "Points Earned certificate". The "Points Earned certificate" could be a print out of a dollar bill with the child's name, date earned, behaviors performed, and points earned that can be saved and traded for reinforcing items. It may also be a print out of a sticker for each behavior to be glued to the "star chart" that was previously printed for the child. These options help motivate the child to perform the selected behaviors.

The last screen the child views is a "Good Bye screen" 324. This screen displays a text-based presentation or an audio file, which includes the child's first name. An example of the "Good Bye screen" could be if the child had very high success ratios "You did very well (Child's first name), today. Keep up the great work. You can do it again tomorrow!"

Figure 16:
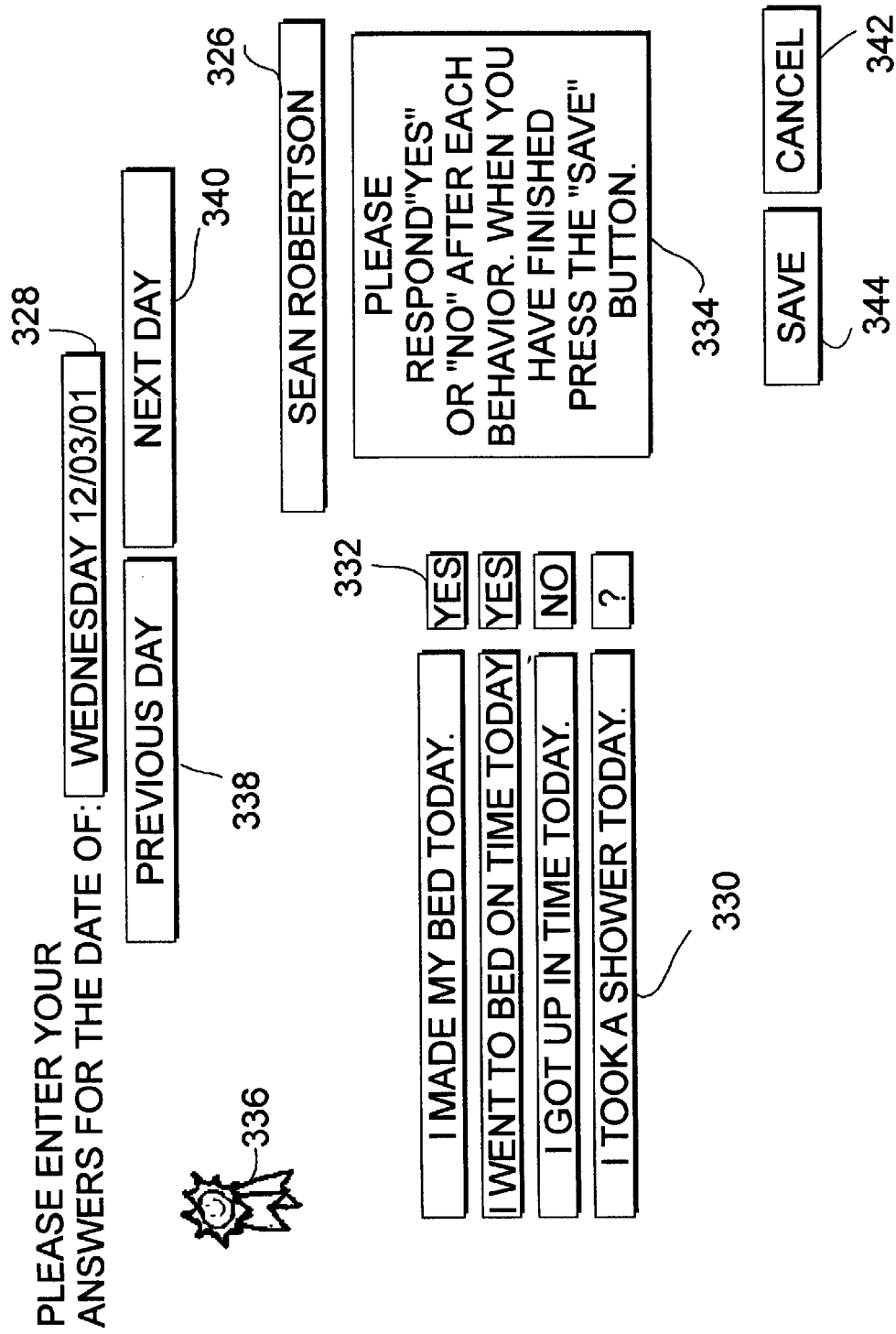
FIG. 16 is an example screen for a child to input daily points.

FIG. 16 illustrates what a child may view when entering his or her daily points. The database 38 (FIG. 2) is queried and returns a child's name 326, a present date 328 generated by a CGI script, and may return the child's first behavior and in a form "I brushed my teeth today" 330 along with its pictorial or multimedia representation. The child selects "Yes" or "No" 332. The child is presented with the second behavior and so on until all behaviors have been answered. The child is finally presented with the last behavior for that day and the child answers it by using a yes or no pull-down menu 332. The child can change any answer by toggling between "yes" and "no". The child may also view a help text 334 that explains how the child will enter daily points and a pleasing graphic 336 that encourages the child.

The child may select a "Previous Day" WIDGET 338 to return to a previous day to enter points or select a "Next Day" WIDGET 340 to go to the next day until he or she reaches the present day. If a child does not select a "yes" or "no", the behavior for that day can be revisited later and the child can then select a yes or no answer for that behavior. The child may select "Cancel" 342 to return to a previous screen or "Save" 344 to send selections and entries to the database 38 (FIG. 2) for storage through the above-mentioned process. Behaviors that have been selected and saved cannot be changed when revisited. Only the PT can edit the child's saved responses in the PT's Chart Edit/View screen.

The advantages of the new invention, a network-assisted behavior management system (NABMS) designed for parents, teachers, and helping professionals, are many. The advantages include the ability to motivate individuals to do selected behaviors that can be represented by a graphic or third party performance programs, such as a math drill program. The parent, teacher and helping professional are not limited to just a typed representation of a behavior, as before. The NABMS can automatically incorporate rewards and their multimedia representation, which are selected from an electronic catalog, thereby making the acquisition of the reward convenient and time saving. The multimedia representation of the reward makes it more motivating for the children. The NABMS allows a parent, teacher, or helping professionals to open their behavior management system for other children, classes and groups from the outside world. They can do this in a cooperative or comparative spirit. This makes using the NABMS more enjoyable and creative. And lastly by delivering the NABMS to many differing remote devices the end user has choices about how they want to connect to the NABMS, This allows for increased end user satisfaction.

Various modifications and alterations to the present invention may be appreciated based on a review of this disclosure. These changes and additions are intended to be within the scope and spirit of this invention as defined by.

What is claimed is:

1. A method for a network assisted behavior management system in which an end user having a network assisted behavior management system behavior user identification selects a third party performance partner and selects a third party performance partner program and indicates that he wants to connect the third party performance partner program to the network assisted behavior management system for use by children having success criteria and identifiers in a network assisted behavior management chart section, the steps including, a) the end user selects the third party performance partner and selects the third party performance partner program, b) the end user enters his network assisted behavior management system user identification at the time of selecting the third party performance program and passes this identifier to the network assisted behavior management system, c) the network behavior management system returns identifiers for a plurality of children from which the end user chooses children and their success criteria and passes this data back to the network assisted management system, d) the network assisted behavior management system assigns the third party performance partner program as a behavior in the network assisted behavior management chart section for the children who were chosen, e) a respective one of a said children uses the third party performance program and the results are passed to the network assisted behavior management system, and f) a respective one of a said children views the met success criteria as a behavior performed in the network assisted behavior management system.

2. A method for a network assisted behavior management system, in which a first end user allows the first end user's children and a second end user's children to view each other's performance to increase their enjoyment of the network assisted behavior management system comprising:

a. the first end user selects the network assisted behavior management system and enters his network assisted behavior management system user identification and passes the identifiers to the network assisted behavior management system, b. the network assisted behavior management system returns identifiers for a plurality of children from which the first end user chooses children to assign to a chart, and passes this data back to the network assisted behavior management system, c. the first end user selects the competitive type of chart for said chart, and passes this data back to the network assisted behavior management system, d. the children use the network assisted behavior management system, and select performance as the behavior criteria in the first end user's chart, e. the first end user's children and second end user's children assigned to the competitive chart can view each other's performance.

3. A method for a network assisted behavior management system, in which a first end user does not allow the first end user's children and a second end user's children to view each other's performance to increase the first end user's and second end user's children's privacy of the network assisted behavior management system comprising:

a. the first end user selects the network assisted behavior management system and enters his network assisted behavior management system user identification and passes the identifiers to the network assisted behavior management system, b. the network assisted behavior management system returns identifiers for a plurality of children from which the first end user chooses children to assign to a chart, and passes this data back to the network assisted behavior management system, c. the first end user selects the cooperative type of chart for said chart, and passes this data back to the network assisted behavior management system, d. the children use the network assisted behavior management system, and select performance as the behavior criteria in the first end user's chart, e. the first end user's children and second end user's children assigned to the cooperative chart can only view their own performance.

4. A method for a network assisted behavior management system, in which a first end user allows a second end user's children to join with his children on the same chart to increase the first end user's children and the second end user's children's enjoyment of the network assisted behavior management system comprising:
   a. the first end user selects the network assisted behavior management system and enters his network assisted behavior management system user identification and passes the identifiers to the network assisted behavior management system,
   b. the network assisted behavior management system returns identifiers for a plurality of children from which the first end user chooses children to assign to a chart, and passes this data back to the network assisted behavior management system,
   c. the first end user selects the public type of chart for said chart, and passes this data back to the network assisted behavior management system,
   d. the second end user selects the network assisted behavior management system and enters his network assisted behavior management system user identification and passes the identifiers to the network assisted behavior management system,
   e. the network assisted behavior management system returns identifiers for a plurality of the second end user's children from which the second end user chooses children to assign to the first end user's public chart, and passes this data back to the network assisted behavior management system,
   f. the first end user's children and the second end user's children assigned to the chart use the network assisted behavior management system, and select performance as the behavior criteria in the first end user's chart,
   g. the first end user's children and second end user's children assigned to the public chart can view their combined performance.

5. A method for a network assisted behavior management system, in which a first end user only allows his own children to be assigned to the first end user's chart, and prevents a second end user from assigning the second end user's children to the first end user's chart comprising:
   a. the first end user selects the network assisted behavior management system and enters his network assisted behavior management system user identification and passes the identifiers to the network assisted behavior management system,
   b. the network assisted behavior management system returns identifiers for a plurality of children from which the first end user chooses children to assign to a chart, and passes this data back to the network assisted behavior management system,
   c. the first end user selects the private type of chart for said chart, and passes this data back to the network assisted behavior management system,
   d. the second end user selects the network assisted behavior management system and enters his network assisted behavior management system user identification and passes the identifiers to the network assisted behavior management system,
   e. the network assisted behavior management system returns identifiers for a plurality of the second end user's children which the second end user cannot assign to the first end user's private chart,
   f. wherein only the first end user may view the performance of the end user's selected children as recorded on said private chart.

6. A method for a network assisted behavior management system, in which a first end user allows a second end user's children to join with his children in a same group to increase the first end user's children and the second end user's children's enjoyment of the network assisted behavior management system comprising:
   a. the first end user selects the network assisted behavior management system and enters his network assisted behavior management system user identification and passes the identifiers to the network assisted behavior management system,
   b. the network assisted behavior management system returns identifiers for a plurality of children from which the first end user chooses children to assign to the group, and passes this data back to the network assisted behavior management system,
   c. the first end user selects the public type of group for said group, and passes this data back to the network assisted behavior management system,
   d. the first end user assigns said group to a chart,
   e. the second end user selects the network assisted behavior management system and enters his network assisted behavior management system user identification and passes the identifiers to the network assisted behavior management system,
   f. the network assisted behavior management system returns identifiers for a plurality of the second end user's children from which the second end user chooses children to assign to the first end user's public group, and passes this data back to the network assisted behavior management system,
   g. the first end user's children and the second end user's children assigned to the first end user's group use the network assisted behavior management system, and select performance as the behavior criteria in the first end user's group chart,
   h. the first end user's children and second end user's children view the performance of the group as an accounting of their total performance.

7. A method for a network assisted behavior management system, in which a first end user does not allow a second end user's children to join with the first end user's children in a same group to increase the first end user's children's privacy of the network assisted behavior management system comprising:
   a. the first end user selects the network assisted behavior management system and enters his network assisted behavior management system user identification and passes the identifiers to the network assisted behavior management system,
   b. the network assisted behavior management system returns identifiers for a plurality of children from which the first end user chooses children to assign to the group, and passes this data back to the network assisted behavior management system,
   c. the first end user selects the private type of group for said group, and passes this data back to the network assisted behavior management system,
   d. the first end user assigns said group to a chart,
   e. the second end user selects the network assisted behavior management system and enters his network assisted behavior management system user identification and passes the identifiers to the network assisted behavior management system,
   f. the network assisted behavior management system returns identifiers for a plurality of the second end user's children from which the second end user cannot assign the second end user's children to the first end user's private group, g. the first end user's children assigned to the first end user's private group use the network assisted behavior management system, and select performance as the behavior criteria in the first end user's private chart.

8. A method for a network assisted behavior management system, in which a first end user creates a chart wherein the performance of the first end user's children and a second end user's children assigned to the chart is their own performance comprising:

a. the first end user selects the network assisted behavior management system and enters his network assisted behavior management system user identification and passes the identifiers to the network assisted behavior management system, b. the network assisted behavior management system returns identifiers for a plurality of children from which the first end user chooses children to assign to a chart, and passes this data back to the network assisted behavior management system, c. the first end user selects the individual type of chart for said chart, and passes this data back to the network assisted behavior management system, d. the second end user selects the network assisted behavior management system and enters his network assisted behavior management system user identification and passes the identifiers to the network assisted behavior management system, e. the network assisted behavior management system returns identifiers for a plurality of the second end user's children from which the second end user can choose children to assign to the first end user's chart that was selected as public by the first end user, and passes this data back to the network assisted behavior management system, f. the first end user's children and second end user's children assigned to the chart use the network assisted behavior management, and view their performance as only their own individual performance.

9. A method for a network assisted behavior management system, in which a first end user creates a chart wherein the performance of the first end user's children and a second end user's children assigned to the chart is accounted for to increase their enjoyment of the network assisted behavior management system comprising:

a. the first end user selects the network assisted behavior management system and enters his network assisted behavior management system user identification and passes the identifiers to the network assisted behavior management system, b. the network assisted behavior management system returns identifiers for a plurality of children from which the first end user chooses children to assign to the group, and passes this data back to the network assisted behavior management system, c. the network assisted behavior management system returns identifiers for a plurality of groups from which the first end user chooses groups to assign to a chart, and passes this data back to the network assisted behavior management system, d. the first end user selects the group type of chart for the chart, and passes this data back to the network assisted behavior management system, e. the second end user selects the network assisted behavior management system and enters his network assisted behavior management system user identification and passes the identifiers to the network assisted behavior management system, f. the network assisted behavior management system returns identifiers for a plurality of the second end user's children from which the second end user can choose children to assign to a first end user's group, and passes this data back to the network assisted behavior management system, g. the network assisted behavior management system returns identifiers for a plurality of the second end user's groups from which the second end user can choose groups to assign to the first end user's chart that was selected as public by the first end user, and passes this data back to the network assisted behavior management system, h. the first end user's children and second end user's children assigned to the public chart use the network assisted behavior management system, and view their performance as an account of their combined performance in their perspective groups.

* * * * *